(12) United States Patent
Chrisman

(10) Patent No.: US 11,941,447 B2
(45) Date of Patent: *Mar. 26, 2024

(54) OBJECT-ORIENTED MEMORY CLIENT

(71) Applicant: Marvell Asia Pte, Ltd., Singapore (SG)

(72) Inventor: Nathan Chrisman, Meridian, ID (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,686

(22) Filed: May 3, 2023

(65) Prior Publication Data

US 2023/0273823 A1 Aug. 31, 2023

Related U.S. Application Data

(63) Continuation of application No. 17/681,331, filed on Feb. 25, 2022, now Pat. No. 11,675,623, which is a
(Continued)

(51) Int. Cl.
*G06F 9/50* (2006.01)
*G06F 5/06* (2006.01)
(Continued)

(52) U.S. Cl.
CPC ............ *G06F 9/5016* (2013.01); *G06F 5/065* (2013.01); *G06F 9/3818* (2013.01); *G06F 9/3877* (2013.01); *G06F 9/4488* (2018.02); *G06F 9/546* (2013.01); *G06F 9/548* (2013.01); *G06F 11/1004* (2013.01); *G06F 12/0253* (2013.01);
(Continued)

(58) Field of Classification Search
None
See application file for complete search history.

(56) References Cited

U.S. PATENT DOCUMENTS

| 5,291,593 A | 3/1994 | Abraham et al. |
| 5,590,334 A | 12/1996 | Saulpaugh et al. |

(Continued)

FOREIGN PATENT DOCUMENTS

EP 0483036 A2 4/1992

OTHER PUBLICATIONS

U.S. Non-Final Office Action for U.S. Appl. No. 18/180,523, entitled "Object-Oriented Memory for Client-to-Client Communications," dated Oct. 4, 2023.
(Continued)

*Primary Examiner* — Syed A Roni
(74) *Attorney, Agent, or Firm* — Hamilton, Brook, Smith & Reynolds, P.C.

(57) ABSTRACT

A hardware client and corresponding method employ an object-oriented memory device. The hardware client generates an object-oriented message associated with an object of an object class. The object class includes at least one data member and at least one method. The hardware client transmits the object-oriented message generated to the object-oriented memory device via a hardware communications interface. The hardware communications interface couples the hardware client to the object-oriented memory device. The object is instantiated or to-be instantiated in at least one physical memory of the object-oriented memory device according to the object class. The at least one method enables the object-oriented memory device to access the at least one data member for the hardware client.

30 Claims, 27 Drawing Sheets

Related U.S. Application Data continuation of application No. 16/940,229, filed on Jul. 27, 2020, now Pat. No. 11,294,722.

(60) Provisional application No. 62/879,795, filed on Jul. 29, 2019.

(51) Int. Cl.

| | | |
|---|---|---|
| *G06F 9/38* | (2018.01) | |
| *G06F 9/448* | (2018.01) | |
| *G06F 9/54* | (2006.01) | |
| *G06F 11/10* | (2006.01) | |
| *G06F 12/02* | (2006.01) | |
| *G06F 12/0893* | (2016.01) | |
| *G06F 13/16* | (2006.01) | |

(52) U.S. Cl.
CPC ...... *G06F 12/0893* (2013.01); *G06F 13/1673* (2013.01); *G06F 2213/0026* (2013.01)

(56) References Cited

U.S. PATENT DOCUMENTS

| | | | |
|---|---|---|---|
| 6,298,401 | B1 | 10/2001 | Anderson |
| 9,367,554 | B1 | 6/2016 | Heemskerk et al. |
| 11,294,721 | B2 | 4/2022 | Chrisman |
| 11,294,722 | B2 | 4/2022 | Chrisman |
| 11,635,992 | B2 | 4/2023 | Chrisman |
| 11,675,623 | B2 | 6/2023 | Chrisman |
| 2004/0015873 | A1 | 1/2004 | Sokolov et al. |
| 2005/0268067 | A1 | 12/2005 | Lee et al. |
| 2010/0146233 | A1 | 6/2010 | Chrisman |
| 2010/0313065 | A1 | 12/2010 | Feeley et al. |
| 2012/0079174 | A1 | 3/2012 | Nellans et al. |
| 2013/0326180 | A1 | 12/2013 | Mamidala et al. |
| 2016/0170649 | A1 | 6/2016 | Ramesh et al. |
| 2017/0031633 | A1 | 2/2017 | Lee |
| 2018/0018216 | A1 | 1/2018 | Halford |
| 2018/0365271 | A1 | 12/2018 | Castaing |
| 2021/0034379 | A1 | 2/2021 | Chrisman |
| 2021/0034380 | A1 | 2/2021 | Chrisman |
| 2021/0034424 | A1 | 2/2021 | Chrisman |
| 2022/0179704 | A1 | 6/2022 | Chrisman |
| 2022/0179705 | A1 | 6/2022 | Chrisman |
| 2023/0221991 | A1 | 7/2023 | Chrisman |

OTHER PUBLICATIONS

Notice of Allowance for U.S. Appl. No. 17/681,426, entitled "Object-Oriented Memory for Client-to-Client Communications," dated Feb. 16, 2023.

Notice of Allowance for U.S. Appl. No. 17/681,331, entitled "Object-Oriented Memory Client;" dated Feb. 17, 2023.

Notice of Allowance for U.S. Appl. No. 16/940,214 entitled "Object-Oriented Memory for Client-to-Client Communications," dated Jan. 12, 2022.

Notice of Allowance for U.S. Appl. No. 16/940,229 entitled "Object-Oriented Memory Client;" dated Jan. 5, 2022.

U.S. Non-Final Office Action for U.S. Appl. No. 17/681,426, entitled "Object-Oriented Memory for Client-to-Client Communications," dated Oct. 26, 2022.

U.S. Final Office Action for U.S. Appl. No. 16/940,214, entitled "Object-Oriented Memory for Client-to-Client Communications," dated Dec. 8, 2021.

U.S. Non-Final Office Action for U.S. Appl. No. 16/940,214, entitled "Object-Oriented Memory for Client-to-Client Communications," dated Jul. 28, 2021.

U.S. Non-Final Office Action for U.S. Appl. No. 17/681,331, entitled "Object-Oriented Memory Client;" dated Oct. 25, 2022.

Non-Final Office Action received for U.S. Appl. No. 16/940,217, dated Aug. 9, 2023, 20 pages.

U.S. Non-Final Office Action for U.S. Appl. No. 16/940,229, entitled "Object-Oriented Memory Client," dated Aug. 19, 2021.

OBJECT-ORIENTED MEMORY CLIENT

RELATED APPLICATIONS

This application is a continuation of U.S. application Ser. No. 17/681,331, filed Feb. 25, 2022, now U.S. Pat. No. 11,675,623 issued on Jun. 13, 2023, which is a continuation of U.S. application Ser. No. 16/940,229, filed Jul. 27, 2020, now U.S. Pat. No. 11,294,722 issued on Apr. 5, 2022, which claims the benefit of U.S. Provisional Application No. 62/879,795, filed on Jul. 29, 2019. The entire teachings of the above applications are incorporated herein by reference.

BACKGROUND

A linear memory model refers to a memory addressing paradigm in which memory appears as a single contiguous address space in which a client of the memory, such as central processing unit (CPU) can directly, and linearly, address all of the available memory locations. A key feature of the linear memory model is that the entire memory space is linear, sequential, and contiguous.

In a single tasking embedded application, where memory management is not needed nor desirable, the linear memory model is appropriate because it provides the simplest interface from a programmer's point of view, with direct access to all memory locations and minimum design complexity. A general-purpose computer system, however, requires multitasking, resource allocation, and protection. As such, memory management and address translation are often implemented on top of the linear memory model in order to facilitate, for example, functionality of an operating system, resource protection, or multitasking. Memory management is often implemented through a combination of dedicated hardware (inside or outside the CPU) and software built into the operating system. The majority of processor architectures implement a linear memory model and, thus, implement advanced memory management and protection technology over the linear memory model.

SUMMARY

According to an example embodiment, a hardware client of an object-oriented memory device is configured to generate an object-oriented message associated with an object of an object class. The object class includes at least one data member and at least one method. The hardware client is further configured to transmit the object-oriented message generated to the object-oriented memory device via a hardware communications interface coupling the hardware client to the object-oriented memory device. The object is instantiated or to-be instantiated in at least one physical memory of the object-oriented memory device according to the object class. The at least one method enables the object-oriented memory device to access the at least one data member for the hardware client.

The hardware client may be a given hardware client of at least one hardware client of the object-oriented memory device. The given hardware client may be coupled via the hardware communications interface to a given communications port of at least one communications port of the object-oriented memory device. The given communications port may be allocated solely to the given hardware client or shared among the given hardware client and at least one other hardware client of the at least one hardware client for communicating object-oriented messages with the object-oriented memory device.

The hardware communications interface may include two uni-directional streaming message bus (SMBus) buses. It should be understood, however, that the hardware communications interface is not limited thereto.

The object class may be a buffer object class, queue object class, stack object class, or broadcast object class. It should be understood, however, that the object class is not limited thereto.

The at least one method may include an allocation method, de-allocation method, size method, write method, read method, push method, pop method, modify-in-place method, copy method, cyclic redundancy check (CRC) generation method, CRC check method, error-correcting code (ECC) method, randomization method, or a combination thereof. It should be understood, however, that the at least one method is not limited thereto.

The object may be a new object to-be-instantiated in the at least one physical memory. The object-oriented message may be a request to declare the new object. The request may include the object class for the new object. The object class may define the new object.

The object-oriented message may be a request to call a given method of the at least one method. The request may include a handle for the object and a method identifier of a given method of the at least one method.

The object-oriented message may include at least one argument and the object-oriented memory device may execute a given method of the at least one method. Such execution may employ the at least one argument.

The hardware client may be a central processing unit (CPU), Peripheral Component Interconnect Express (PCIe) device, Ethernet device, accelerator device, or digital signal processing (DSP) device. It should be understood, however, that the hardware client is not limited thereto.

The hardware client may be a hardware process configured to interact with a stack of an operating system and the object-oriented message may be sourced from the stack.

The hardware client may be a hardware process configured to employ data stored in the at least one physical memory and the object-oriented memory device may be configured to manage a structure of the data in the at least one physical memory for the hardware process via the object.

The hardware client may be a hardware process and the object may be a private storage buffer employed by the hardware process. The at least one data member may be stored in the private storage buffer.

The object may be an error-correcting code (ECC) object. A payload may be included in the object-oriented message. The at least one data member may include an ECC corrected version of the payload.

The object may be a first-in first-out (FIFO) object and the at least one data member may be a data element of the FIFO object.

The object may be a stack object and the at least one data member may include nested thread context.

The object-oriented message may include a message type, process identifier, process tag, object identifier, method identifier, argument list, or a combination thereof. It should be understood, however, that the object-oriented message is not limited to including same.

According to another example embodiment, a method may comprise generating, at a hardware client of an object-oriented memory device, an object-oriented message associated with an object of an object class, the object class including at least one data member and at least one method. The method may further comprise transmitting the object-oriented message generated to the object-oriented memory device via a hardware communications interface coupling the hardware client to the object-oriented memory device. The object is instantiated or to-be instantiated in at least one physical memory of the object-oriented memory device according to the object class. The at least one method enables the object-oriented memory device to access the at least one data member for the hardware client.

Alternative method embodiments parallel those described above in connection with the example hardware client embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
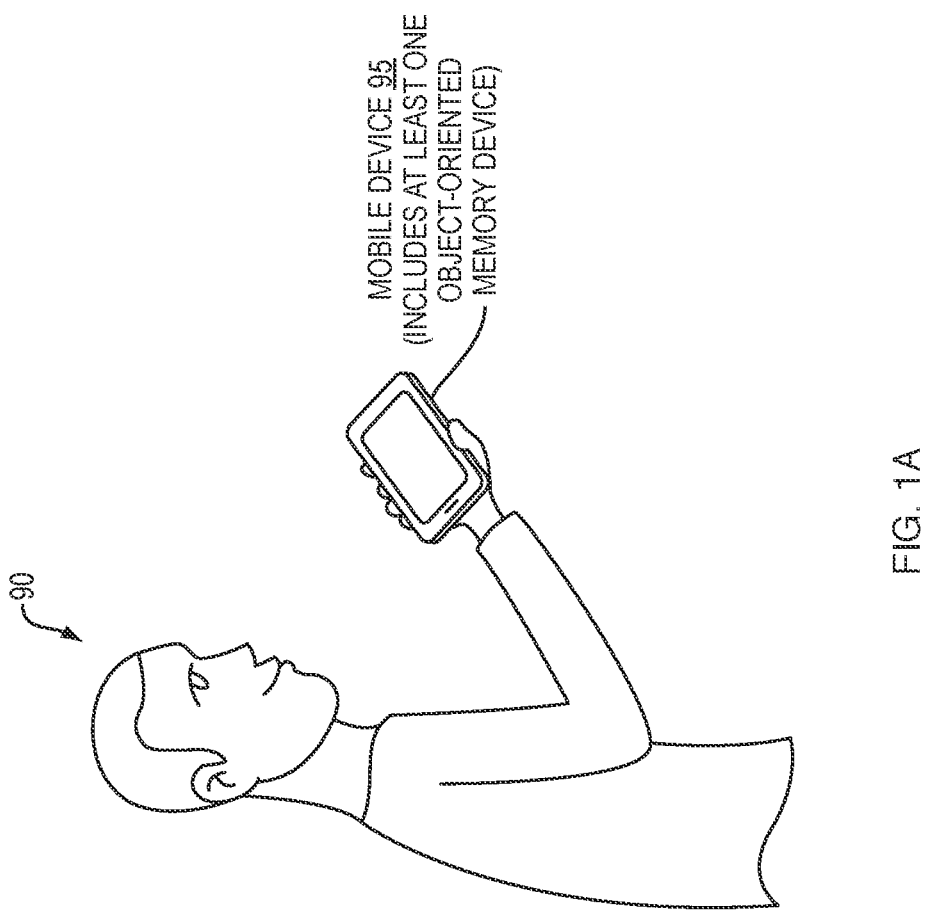
FIG. 1A is a block diagram of an example embodiment of a user interacting with a mobile device that includes at least one object-oriented memory device.

A description of example embodiments follows.

A hardware client, as disclosed herein, may be referred to interchangeably herein as a memory client. A hardware client may also be referred to interchangeably herein as a hardware block and may be a stand-alone device, a configurable or non-configurable hardware logic block that is employed on a field programmable gate array (FPGA) or application-specific integrated circuit (ASIC), or a hardware process that executes on the stand-alone device or the configurable or non-configurable hardware logic block. A read or write instruction/operation/transaction as disclosed herein may be performed via address and data buses and read/write signals. A message transaction, as disclosed herein, may be a uni-directional or bi-directional message communication. A native instruction, as disclosed herein, is an instruction that may be machine code that does not require translation in order to be executed. A virtual machine, as disclosed herein, may be a computer system that, similar to a physical computer, is capable of running an operating system and applications. While multiple types of objects, object classes, and object methods may be disclosed herein, it should be understood that an object, object class, and object method is not limited to such types disclosed herein. Further, it should be understood that an object that is instantiated in memory exists in that memory, that is, such object has been allocated a region of the memory and is stored therein.

Large-scale custom designs frequently feature an internal static random-access memory (SRAM)-backed memory with multiple connected hardware blocks, such as a peripheral component interconnect express (PCIe) hardware block, Ethernet hardware block, central processing unit (CPU) cluster hardware block, accelerator block, digital signal processing (DSP) hardware block, or any other hardware block that employs memory for performing a hardware function.

Typically, each hardware block has its own read and write hardware ports for memory access. The hardware blocks perform a variety of distinct functions and the memory is typically a shared resource among the hardware blocks. The shared memory, such as an SRAM memory or other type of memory, is typically modeled as block memory, also referred to interchangeably herein as a linear memory, that is, a linear array of addressable data locations which may be written or read. As such, data within the memory is typically accessed by the hardware blocks via one of two mechanisms: write (address, data) or read (address). The hardware blocks are typically allocated regions of the memory address space and are responsible for managing such allocated regions.

The block memory model does not accommodate many software usage models, natively. For example, software often handles sets of data as first-in first-out (FIFO) data structures, mailboxes, queues, stacks, associative arrays, etc. The block memory model forces most of the complexity for data organization of same to the hardware clients, such as the hardware blocks disclosed above, or other hardware clients that may interface with the memory, directly. As such, hardware clients of the memory typically employ memory management. This is both inefficient and error prone as each hardware client duplicates such memory management that may, in some instances, be complex.

Block/linear memory devices do not typically provide inherent data privacy or protection. Thus, when used as a shared resource, risk of accidental data corruption may be significant. For example, if a process overflows its allotted data range, it can silently corrupt data in an unrelated memory region that is allocated to another process. Such silent corruption is often difficult to identify, for example, prior to release of a product in which such data corruption may occur, and such silent corruption is often difficult to debug. Vulnerability to silent memory corruption is well recognized and is, in large part, a cause for elaborate memory protection mechanisms within systems incorporating a shared memory resource.

Hardware clients that share a traditional block/linear memory have respective lower and upper bounds defining their respective allotted ranges of the memory space and are expected to self-manage their respective data stored therein. The hardware clients are further expected to self-check that they do not operate in regions outside of their respective allotted ranges. As such, a hardware client may have an upper-layer for implementing "interesting" functions with respect to data stored in their respective allocated range and a lower-layer for managing the structure of that data in the memory.

For example, two hardware clients may have a producer-consumer relationship and may pass data through a shared first-in first-out (FIFO) data structure in the block/linear memory. In such an example, an "interesting" function of the producer is to push data to the FIFO data structure and an "interesting" function of the consumer is to pop the data from the FIFO data structure. Both hardware clients would, however, need to manage the FIFO data structure itself, such as by managing read/write pointers thereto, computing differences to determine if the FIFO data structure is empty or full, compute a next offset to the FIFO data structure, etc.

Block/linear memory does not provide common structures or mechanisms that would be useful to enable such hardware clients to focus on their respective "interesting" functions. Because such common structures or mechanisms are not present for enabling same, a burden is placed on the hardware clients to implement layers of data structure management which, in turn, results in duplication of code at the hardware clients and additional effort for design and verification of same at each hardware client.

An example embodiment of a new type of memory device disclosed herein decouples the use of data from the structure of same in the memory and alleviates hardware clients from the burden of implementing data structure management, thereby reducing a footprint (e.g., number of gates) at each of the hardware clients and obviating design and verification of same at each hardware client. According to an example embodiment, the new type of memory device is based on object-oriented mechanisms at a hardware level and is referred to herein as an object-oriented memory device.

According to an example embodiment, objects defined by both data and method(s) may be stored in physical memory, such as SRAM or any other type of physical memory, and the hardware clients are alleviated from the responsibility of managing the structure of the memory employed to store same. An interface between the object-oriented memory device and the hardware clients (also referred to interchangeably herein as memory clients) is based on object-oriented message transactions, as opposed to read-write address/data type transactions. As such, the object-oriented memory device is naturally aligned with software usage of the memory within which objects defined by classes are stored and employed by software processes. Such an object-oriented memory device may be employed in any system that employs memory, such as the mobile device of FIG. 1A, disclosed below. It should be understood, however, that an example embodiment of an object-oriented memory device disclosed herein is not limited to a mobile device.

FIG. 1A is a block diagram of an example embodiment of a user interacting with a mobile device 95 that includes at least one object-oriented memory device, such as the object-oriented memory device 110 of FIG. 1B, disclosed further below. The at least one object-oriented memory device is naturally aligned with software usage of the memory within which objects defined by classes are stored and employed by a hardware controller executing on the at least one object-oriented memory device enabling performance of the mobile device 95 to be improved relative to another mobile device that employs a linear/block memory type device(s).

An example embodiment of the object-oriented memory device enables the rich feature expansion of Object-Oriented Programming (OOP) down to the hardware level. OOP has been a mainstay of the software realm for decades and has been an enabler for scale, stability, and productivity. According to an example embodiment, the primary principles of OOP, disclosed in Table 1, below, apply to an example embodiment of the object-oriented memory device.

TABLE 1

| Principle | Application |
|---|---|
| Abstraction | Simplicity and stability. Define object classes based on intent to use. Implementation changes for an object can be made "under the hood" without changing a messaging interface for object interaction or use of the object. |

TABLE 1-continued

| Principle | Application |
| --- | --- |
| Encapsulation | Privacy and protection. Objects in memory are bounded and access controlled. Each object has its own data and methods independent of other objects. |
| Inheritance | Feature scaling. New classes of objects can be built that extend existing classes. |
| Polymorphism | Data sharing via common access. As long as an object has familiar methods (e.g., a push method for a FIFO or stack), a process doesn't really care about what kind of object it is. |

The concept of objects in memory is currently reserved for upper-layer clients and software. An example embodiment of the object-oriented memory device, however, enables hardware clients to declare, construct, and interact with objects stored on the object-oriented memory device through built-in functions, as disclosed further below.

According to an example embodiment, hardware clients can avoid complex memory management by relying upon the centralized "smartness" of the object-oriented memory device because, unlike typical memory devices, an example embodiment of the object-oriented memory device is object aware. An example embodiment of an object-oriented memory device is based on an object-oriented memory (OOMem) model.

In the OOMem model, objects are defined by class, include both data and method(s), and are referred to by object handles/pointers. A handle to an object, as disclosed herein, is a unique identifier of that object, and may be an integer, pointer, or any other identifier that can uniquely identify an object. In place of read and write transactions performed via address and data buses, an object-oriented memory device that is based on the OOMem model interfaces with hardware clients based on message-based transactions that may be transported over a message bus. The OOMem model may define an "API" that is a message passing interface in which a message is targeted to or produced by a method of an object. Table 2, disclosed below, is a listing of example OOMem messages and corresponding descriptions. It should be understood, however, that object-oriented messages disclosed herein are not limited to the OOMem messages of Table 2, below.

TABLE 2

| Message | Description |
| --- | --- |
| handle request | Request a handle for a new object of <class> |
| handle response | Response with <handle> |
| object.method request | Request a <method> access for object with <handle> |
| object.method response | Response of <method> from object <handle> |

An example embodiment of an object-oriented memory device that is based on an object-oriented memory (OOMem) model is disclosed, below, with reference to FIG. 1B.

Figure 1B:
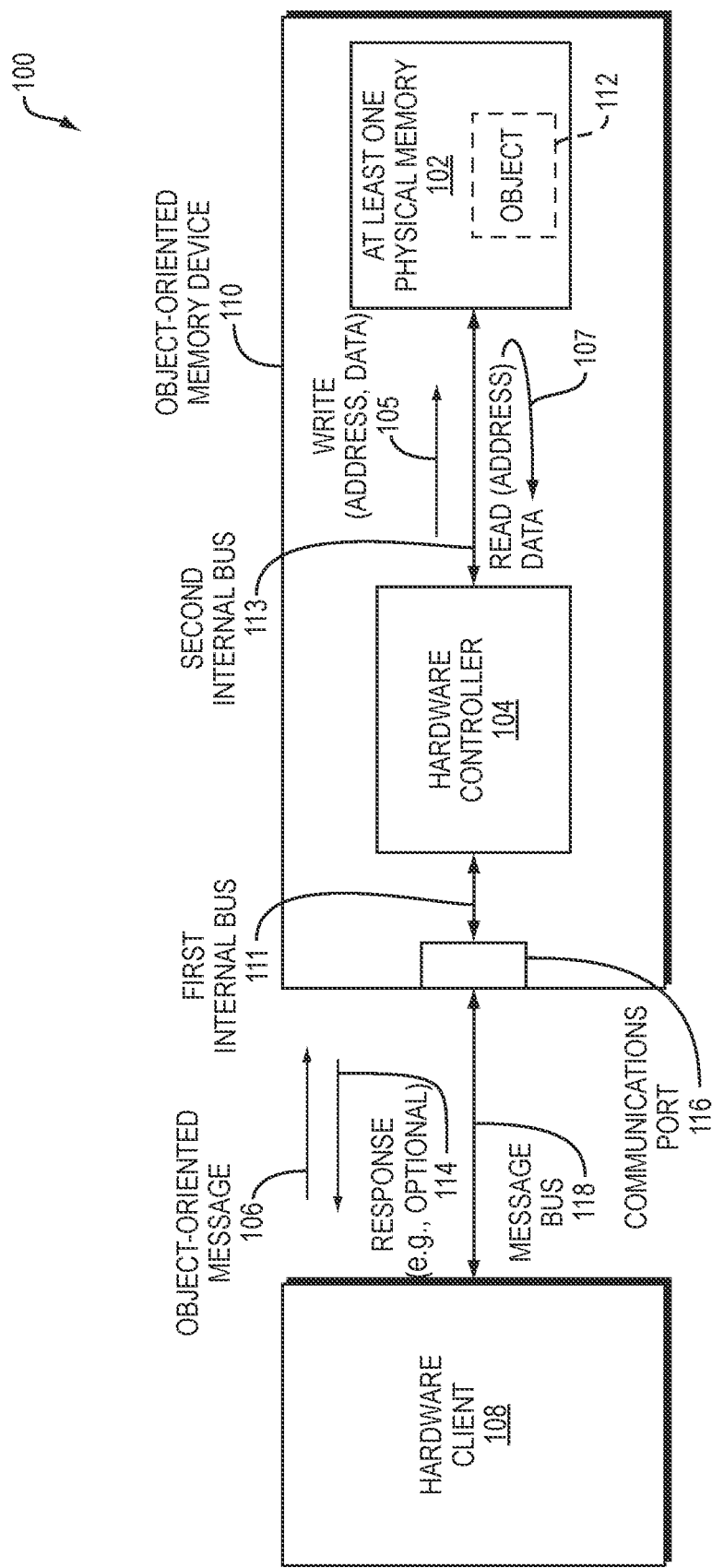
FIG. 1B is a block diagram of an example embodiment of an object-oriented memory device.

FIG. 1B is a block diagram 100 of an example embodiment of an object-oriented memory device 110. The object-oriented memory device 110 includes at least one physical memory 102 and a hardware controller 104. The hardware controller 104 is coupled intra the object-oriented memory device 110 to the at least one physical memory 102 and configured to (i) decode an object-oriented message 106 received from a hardware client 108 of the object-oriented memory device 110 and (ii) perform an action (not shown) for the hardware client 108 based on the object-oriented message 106 received and decoded. The object-oriented message 106 is associated with an object 112 that is instantiated or to-be-instantiated in the at least one physical memory 102. The action is associated with the object 112.

The hardware controller 104 may be further configured to encode a response 114 to the object-oriented message 106 received and decoded and to transmit the response 114 encoded to the hardware client 108. The response 114 encoded may be based on the action performed. It should be understood, however, that the response 114 is optional. It should be understood that communication from the object-oriented memory device 110 to the hardware client 108 is not limited to responses, such as the optional response 114, and may, for example, include an asynchronous notification, as disclosed further below. The object-oriented memory device 110 may be employed in any system within which memory is employed. For example, the object-oriented memory device 110 may be employed in a processor-based system, such as the mobile device 95 of FIG. 1A, disclosed above, personal computer (PC), Ethernet switch, storage system, or any other system that employs memory.

The object-oriented memory device 110 may be a stand-alone device or may be implemented as part of a field programmable gate array (FPGA) or an application-specific integrated circuit (ASIC). The hardware controller 104 and the at least one physical memory 102 may be integrated on a single integrated circuit (not shown), wherein access to the at least one physical memory 102 is performed intra the object-oriented memory device 110 by the hardware controller 104. The at least one physical memory 102 may include a static random-access memory (SRAM) memory, dynamic random-access memory (DRAM), non-volatile random-access memory (NVRAM), linear array with addressable data locations, or a combination thereof. It should be understood, however, that the at least one physical memory 102 is not limited to SRAM, DRAM, NVRAM, or a combination thereof.

The object-oriented message 106 may include a message type, process identifier, process tag, object identifier, method identifier, argument list, or a combination thereof, such as disclosed further below with regard to FIG. 14. It should be understood, however, that the object-oriented message 106 is not limited to including a message type, process identifier, process tag, object identifier, method identifier, argument list, or a combination thereof. The object 112 may include at least one other object (not shown). The hardware controller 104 may be further configured to associate the object 112 with metadata. The metadata may include respective hardware client identifiers of hardware clients subscribed to the object 112, however, it should be understood that such metadata is not limited thereto.

In the example embodiment of FIG. 1B, the object-oriented memory device 110 comprises a communications port 116. The hardware client 108 is coupled to the object-oriented memory device 110 via a message bus 118, also referred to herein as a hardware communications interface, over which object-oriented messages, such as the object-oriented message 106 and response 114 are communicated. The hardware controller 104 is coupled to the communications port 116 via a first internal bus 111 and is coupled to the at least one physical memory 102 via a second internal bus 113.

The first internal bus 111 enables the hardware controller to receive the object-oriented message 106 and transmit the response 114, respectively, via the communications port 116. The second internal bus 113 is employed by the hardware controller 104 to perform a write operation 105 to store data (not shown) that is specified by the write operation 105 at an address (not shown) specified as part of the write operation 105. The second internal bus 113 is further employed by the hardware controller 104 to perform a read operation 107 to read data (not shown) that is stored at an address (not shown) of the at least one physical memory 102. The address is specified as part of the read operation 107.

The hardware client 108 may be a given hardware client of at least one hardware client coupled to the object-oriented memory device 110 via the message bus 118 over which object-oriented messages, such as the object-oriented message 106 and response 114, are communicated. The communications port 116 may be allocated solely to the hardware client 108, such as disclosed further below with reference to FIG. 3, or may be shared among the hardware client 108 and at least one other hardware client for object-oriented message communications with the object-oriented memory device 110. For example, the hardware client 108 may be a given hardware client of a plurality of hardware clients, such as the plurality of hardware clients 208 of FIG. 2 that share a communications port, as disclosed below.

Figure 2:
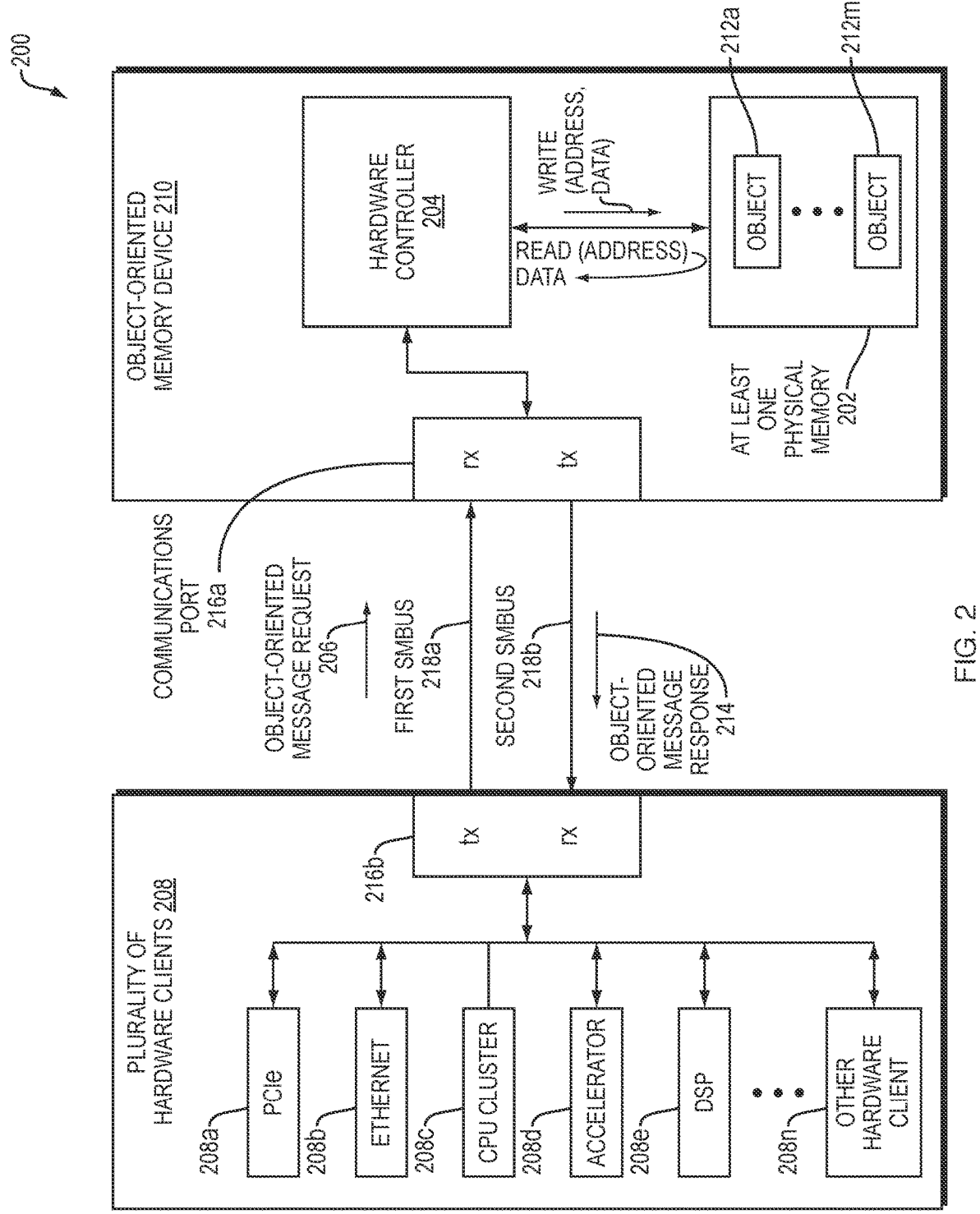
FIG. 2 is a block diagram of an example embodiment of a system that comprises an object-oriented memory device coupled to a plurality of hardware clients.

FIG. 2 is a block diagram of an example embodiment of a system 200 that comprises an object-oriented memory device 210 that is coupled to a plurality of hardware clients 208. Referring to FIG. 1B and FIG. 2, the hardware client 108 of FIG. 1B may be employed as a given hardware client of the plurality of hardware clients 208. The hardware client 108 may be a hardware process of a Peripheral Component Interconnect Express (PCIe) device 208a, Ethernet device 208b, central processing unit (CPU) cluster 208c, accelerator device 208d, digital signal processing (DSP) device 208e, or other hardware client 208n. It should be understood that the plurality of hardware clients 208 is not limited to including a hardware process of a CPU cluster, PCIe device, Ethernet device, accelerator device, DSP device, or a combination thereof. Further, it should be understood that a device may be a stand-alone device or a configurable or non-configurable hardware logic block that is employed, for example, in an FPGA or ASIC.

In the example embodiment of FIG. 2, the object-oriented memory device 210 includes a hardware controller 204 that is coupled, intra the object-oriented memory device 210, to the at least one physical memory 202. The at least one physical memory 202 may be a shared resource used for storing objects, such as the objects 212a—m, associated with respective hardware clients of the plurality of hardware clients 208. The hardware controller 204 may be configured to enforce data privacy and protection of the objects 212a—m stored in the shared resource and alleviates the respective hardware clients from having to perform same. The objects 212a—m are defined by respective object classes, as disclosed further below.

The hardware controller 204 is further coupled to a first communications port 216a. The plurality of hardware clients 208 are coupled to the object-oriented memory device 210 via two uni-directional streaming message bus (SMBus) buses, namely the first SMBus 218a and the second SMBus 218b over which an object-oriented message request 206 and object-oriented message response 214 may be communicated, respectively. Since the first communications port 216a is coupled to the plurality of hardware clients 208 via the two uni-directional streaming message bus SMBus buses and the second communications port 216b, the object-oriented message request 206 may include a unique identifier of a given hardware client of the plurality of hardware clients 208 that sourced the object-oriented message request 206. Similarly, the object-oriented message response 214 may be encoded with a unique identifier of a given hardware client that is to receive the object-oriented message response 214. Alternatively, the object-oriented message response 214 may not be encoded to include a unique identifier of a given hardware client and, as such, may be communicated to the plurality of hardware clients 208.

It should be understood that the plurality of hardware clients 208 need not share a communications port for communicating object-oriented messages with the object-oriented memory device 210. For example, the object-oriented memory device 210 may comprise a plurality of communications ports, a portion of which may be shared or non-shared, such as disclosed below with regard to FIG. 3.

Figure 3:
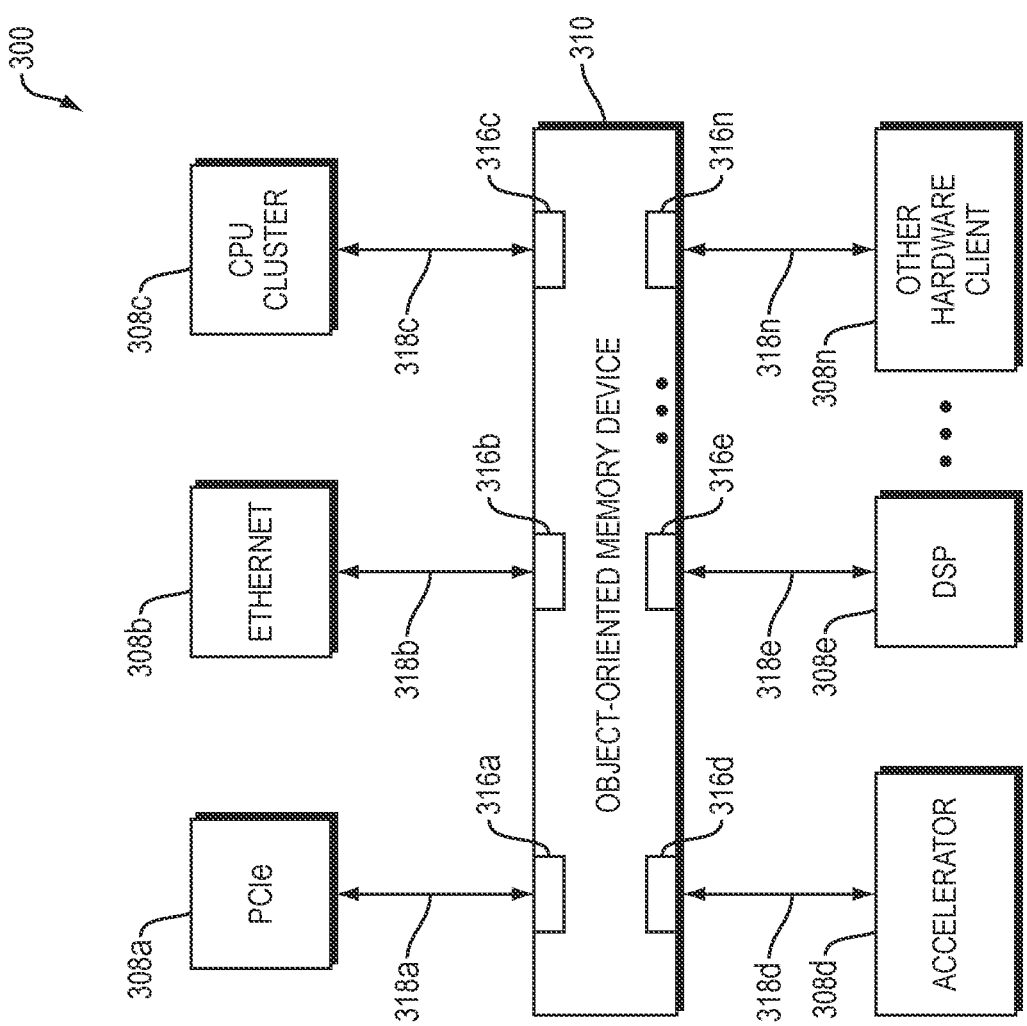
FIG. 3 is a block diagram of another example embodiment of a system that comprises an object-oriented memory device coupled to a plurality of hardware clients.

FIG. 3 is a block diagram of another example embodiment of a system 300 that comprises an object-oriented memory device 310. In the example embodiment of FIG. 3, a plurality of hardware clients, namely a PCIe device 308a, Ethernet device 308b, CPU cluster 308c, accelerator device 308d, DSP device 308e, and other hardware client 308n are coupled to respective communications ports, namely the communications ports 316a, 316b, 316c, 316d, 316e, and 316n, respectively, that may each be allocated, solely, to a respected hardware client coupled thereto, such as disclosed in FIG. 3. Alternatively, a portion of the communications ports 316a-n may be shared or non-shared. Object-oriented messages communicated over the message buses, that is, over the message buses 318a, 318b, 318c, 318d, 318e, and 318n, may not be encoded to include respective unique identifiers of hardware clients because such identifiers may be determined based on a respective communications port that transmits or receives same, if not shared.

Referring back to FIG. 1B, the object 112 may be a new object to-be-instantiated in the at least one physical memory 102 and the object-oriented message 106 may be a request to declare the new object. The request may include an object class for the new object, the object class defining the new object, such as disclosed further below with regard to FIG. 4. The action performed may include allocating a unique handle value (not shown) identifying the new object declared, encoding a response including the unique handle value allocated, and transmitting the response encoded, that is, the response 114, to the hardware client 108. The response 114 encoded is transmitted via the communications port 116.

The request, that is, the object-oriented message 106, is received via the communications port 116 that is a given communications port of at least one communications port. The encoding may include obtaining a unique hardware client identifier (not shown) from the request, that is, from the object-oriented message 106, or deriving the unique hardware client identifier based on the given communications port, that is, the communications port 116, such as disclosed above with regard to FIG. 2. The encoding may include the unique hardware client identifier in the response 114 that is encoded and transmitted.

The object-oriented message 106 may be a request to call a given method (not shown) that is included in the object 112, in an event the object 112 has been instantiated in the at least one physical memory 102. The request may include a handle (not shown) for the object 112 and a method identifier (not shown) of the given method. The action performed may include identifying the given method, based on the handle and method identifier, and executing, intra the object-oriented memory device 110, the given method identified. Such executing may be performed by the hardware controller 104.

The object-oriented message 106 may include at least one argument (not shown). Executing the given method identified may include employing the at least one argument included. The given method identified may be an allocation method (not shown). The at least one argument may include a buffer size (not shown). The executing may include instantiating the object 112 in the at least one physical memory 102 with an object buffer (not shown) according to the buffer size included. Following such instantiation, a subsequent object-oriented message may be transmitted. The given method identified based on same may be a de-allocation method. As such, the executing may include un-instantiating the object 112 with the object buffer.

The action performed may further include encoding the response 114 based on a result (not shown) of the executing and transmitting the response 114 encoded to the hardware client 108. The result may be an indication (not shown) of whether the given method identified was executed and completed successfully. The encoding may include: including the indication in the response 114 that is encoded and transmitted. The result may include data (not shown) that is returned by the given method identified in response to executing. The encoding may include: including the data in the response 114 encoded and transmitted. The response 114 that is encoded may be transmitted by the hardware controller 104 to the hardware client 108 via the given communications port, that is, the communications port 116.

The object-oriented memory device 110 may further comprise at least one processing circuit (not shown). The executing may include employing a given processing circuit (not shown) of the at least one processing circuit to execute the given method identified. The given processing circuit may be an ALU (not shown), CRC generator (not shown), CRC checker (not shown), ECC engine (not shown), matrix engine (not shown), other compute engine (not shown), DMA engine (not shown), or a combination thereof. It should be understood, however, that the given processing circuit is not limited to an ALU, CRC generator, CRC checker, ECC engine, matrix engine, other compute engine, DMA engine, or a combination thereof.

The hardware controller 104 may include a hardware messaging interface (not shown) configured to decode the object-oriented message 106 based on a communications protocol (not shown) that defines a set of object-oriented message requests (not shown) and responses (not shown) and format (not shown) thereof. The hardware controller 104 may be further configured to generate the response 114 based on the communications protocol and to transmit the response 114 generated to the hardware client 108. The object-oriented message requests and responses defined may be packets of varying or same lengths.

The hardware controller 104 may include a memory manager (not shown) configured to instantiate the object 112 in the at least one physical memory 102. The memory manager may be further configured to associate the object 112 instantiated with a unique hardware client identifier of the hardware client 108. The unique hardware client identifier may be obtained from the object-oriented message 106 or derived based on the communications port 116 that receives same. The memory manager may be further configured to allocate and deallocate memory of the at least one physical memory 102 for objects associated with a respective object class, data member, and method, such as disclosed below with regard to FIG. 4.

Figure 4:
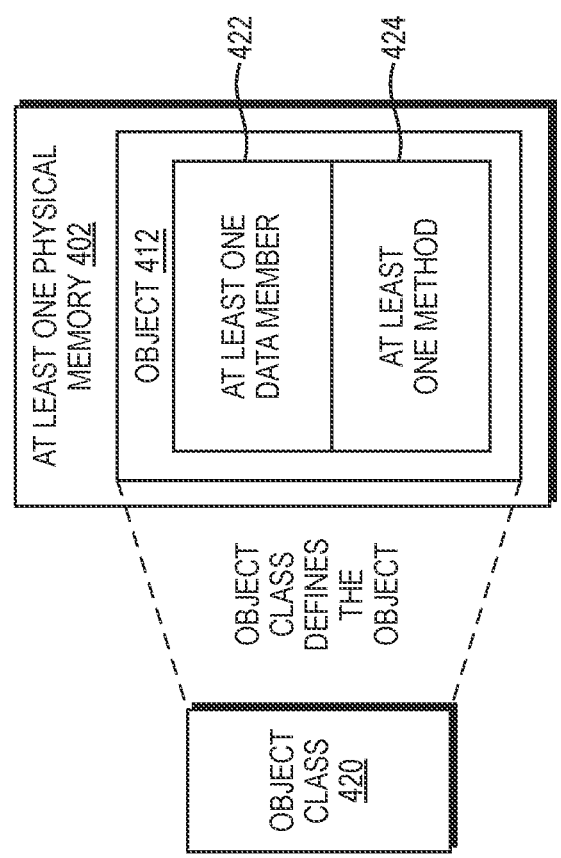
FIG. 4 is a block diagram of an example embodiment of an object stored in at least one physical memory of an object-oriented memory device.

FIG. 4 is a block diagram of an example embodiment of an object 412 stored in at least one physical memory 402 of an object-oriented memory device, such as the object-oriented memory device 110, object-oriented memory device 210, or object-oriented memory device 310, disclosed above with regard to FIG. 1B, FIG. 2, and FIG. 3, respectively, or any other object-oriented memory device disclosed herein. The object 412 is defined by an object class 420. The object 412 includes at least one data member 422 and at least one method 424, as defined by the object class 420. The object class 420 may be a buffer object class, queue object class, stack object class, or broadcast object class. It should be understood, however, that the object class is not limited thereto.

In an event the object class 420 is the buffer object class, the at least one data member 422 may include a buffer and the at least one method 424 may include a read method and write method for reading and writing the buffer, respectively, such as disclosed further below with regard to FIGS. 6 and 7.

In an event the object class 420 is the queue object class, the at least one data member 422 may include a first-in first-out (FIFO) data structure, read pointer, and write pointer; and the at least one method 424 may include a push method and pop method for pushing data to the FIFO data structure and popping data from the FIFO data structure, respectively, such as disclosed further below with regard to FIGS. 6 and 9. The push and pop methods may employ the write and read pointers, respectively.

In an event the object class 420 is the stack object class, the at least one data member 422 may include a first-in last-out (FILO) data structure, read pointer, and write pointer; and the at least one method 424 may include a push method and pop method for pushing data to the FILO data structure and popping data from the FILO data structure, respectively, such as disclosed further below with regard to FIG. 10. The push and pop methods may employ the write and read pointers, respectively.

In an event the object class 420 is the broadcast object class, the at least one data member 422 may include at least one variable (not shown), the at least one method 424 may include a read method and write method for reading and writing a given variable of the at least one variable. The at least one method 424 may further include a subscribe method for registering to receive a notification of a change in value of the given variable and an unsubscribe method for de-registering to receive the notification.

Figure 12:
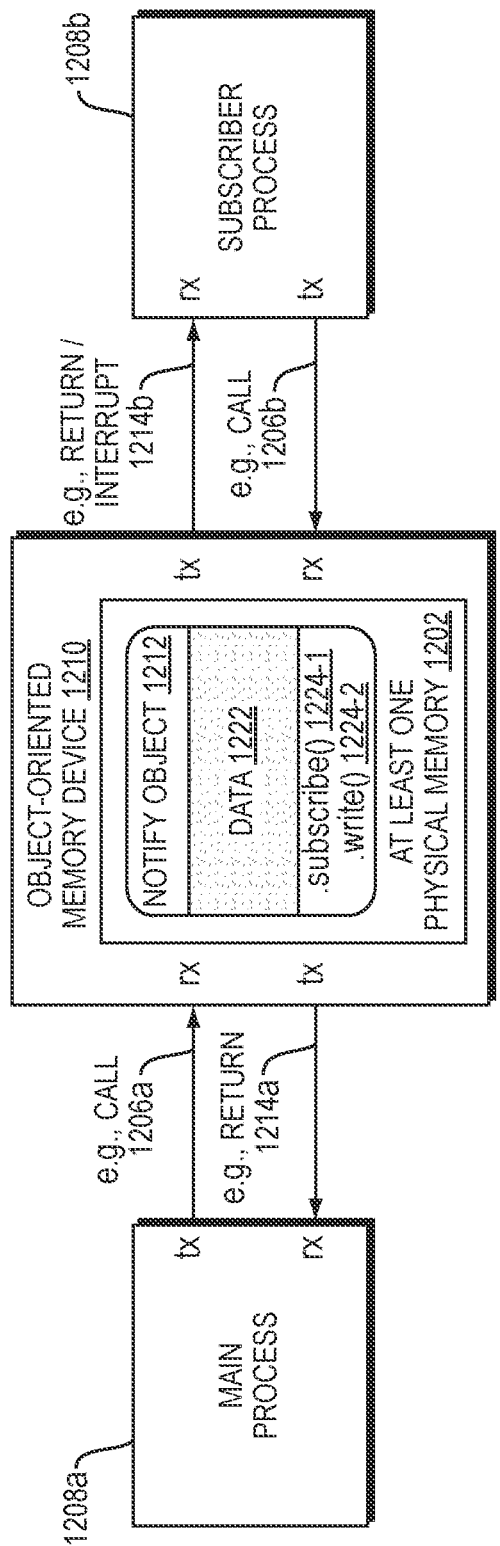
FIG. 12 is a block diagram of an example embodiment of an object-oriented memory device with a notification object instantiated in at least one physical memory.

In an event the value of the given variable changes, the hardware controller, such as the hardware controller 104 of FIG. 1B, disclosed above, or other hardware controller disclosed herein, may be further configured to generate an object-oriented notification message (not shown) associated with the object 412 and to transmit the object-oriented notification message generated to each hardware client of the object-oriented memory device that is subscribed to receive the notification, such as disclosed further below with regard to FIG. 12.

Continuing with FIG. 4, the at least one method 424 may include an allocation method, de-allocation method, size method, write method, read method, push method, pop method, modify-in-place method, copy method, cyclic redundancy check (CRC) generation method, CRC check method, error-correcting code (ECC) method, randomization method, or a combination thereof. It should be understood, however, that the at least one method is not limited thereto. The object class 420 may be defined in a class library included in the object-oriented memory device, such as the class library 526 of the object-oriented memory device 510, disclosed below with regard to FIG. 5.

Figure 5:
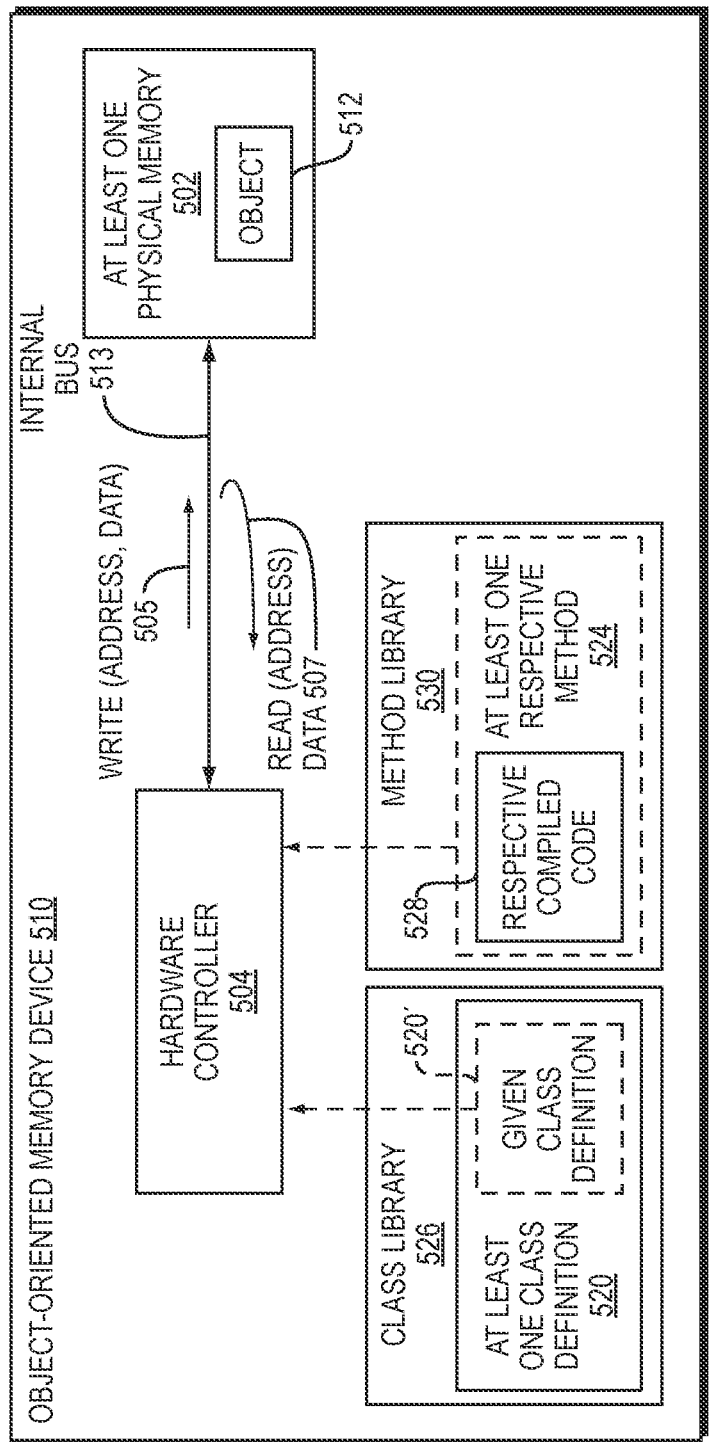
FIG. 5 is a block diagram of an example embodiment of an object-oriented memory device that comprises a class library and method library.

FIG. 5 is a block diagram of an example embodiment of an object-oriented memory device 510 that comprises the class library 526 and a method library 530. The object-oriented memory device 510 includes at least one physical memory 502 and a hardware controller 504 coupled by an internal bus 513. The internal bus 513 is employed by the hardware controller 504 to perform a write operation 505 to store data (not shown) that is specified by the write operation 505 at an address (not shown) specified as part of the write operation 505. The internal bus 513 is further employed by the hardware controller 504 to perform a read operation 507 to read data (not shown) that is stored at an address (not shown) of the at least one physical memory 502. The address is specified as part of the read operation 507.

The object-oriented memory device 510 may be implemented as the object-oriented memory device 110, object-oriented memory device 210, or object-oriented memory device 310 of FIG. 1B, FIG. 2, and FIG. 3, respectively, disclosed above, or another object-oriented memory device disclosed herein. The class library 526 includes at least one class definition 520. The method library 530 includes at least one respective method 524 associated with a given class definition 520' of the at least one class definition 520. The at least one respective method 524 may include respective compiled code 528 for execution by the hardware controller 504 or a pointer (not shown) thereto.

The hardware controller 504 may be further configured to employ the given class definition 520' to instantiate the object 512 in the at least one physical memory 502. The object 512 that is instantiated may include the respective compiled code 528 of the at least one respective method 524 or the pointer thereto. According to an example embodiment, the object-oriented memory device 510 may comprise non-volatile memory (not shown), such as a read-only memory (ROM) or other type of non-volatile memory, and the class library 526 and method library 530 may be stored in the non-volatile memory.

As disclosed above, the object-oriented memory device 510 may be implemented as the object-oriented memory device 110 of FIG. 1B, disclosed above. With reference to FIG. 1B and FIG. 5, the hardware controller 104 may include a memory manager (not shown). The object-oriented memory device 110 may further comprise a class library, such as the class library 526 of FIG. 5, disclosed above, that is configured to store object class definitions. The memory manager may be further configured to employ the given class definition 520' of the class library 526 to instantiate the object 112 in the at least one physical memory 102. The given class definition 520' defines the object 112.

According to an example embodiment, the memory manager may be further configured to perform garbage collection to recycle physical space of the at least one physical memory 102 in response to un-instantiation of objects intra the object-oriented memory device 110. Such garbage collection may be performed as part of a background task (not shown) that is executed by the memory manager or in response to a command (not shown) that may be received by the hardware controller 504 via a management port (not shown) of the object-oriented memory device 110.

According to an example embodiment, data (not shown) that is associated with the hardware client 108 may be included in the object 112 if instantiated in the at least one physical memory 102. The action performed may include accessing the data for the hardware client 108 via at least one method of an object class defining the object 112, such as the at least one respective method 524 of the given class definition 520' disclosed above with regard to FIG. 5.

Referring back to FIG. 1B, the action performed may further include transmitting the response 114 to the hardware client 108, wherein the response 114 is transmitted with the data accessed included in the response 114. According to an example embodiment, the hardware client 108 may be a hardware process (not shown) that is configured to interact with a stack (not shown) of an operating system of the hardware client 108. The object-oriented message 106 may be sourced from the stack. Because the object-oriented memory device 110 is configured to interpret messages that are object-oriented, the hardware client 108 is alleviated from translating same into read-write transactions with the at least one physical memory 102, managing data structure of data related thereto, and performance of the hardware client 108 may be increased by employing the object-oriented memory device 110 instead of employing a block/linear memory device that is not object aware.

According to an example embodiment, the hardware process may be configured to employ data (not shown) stored in the at least one physical memory 102 and the hardware controller 104 may be further configured to manage a structure of the data in the at least one physical memory 102 for the hardware process via the object 112. The object 112 may be a private storage buffer, such as object-3 612c of FIG. 6, disclosed below, that may be employed by the hardware process, that is, the hardware client 108. The action performed may include accessing the private storage buffer for the hardware process, such as disclosed below with regard to FIG. 6.

Figure 6:
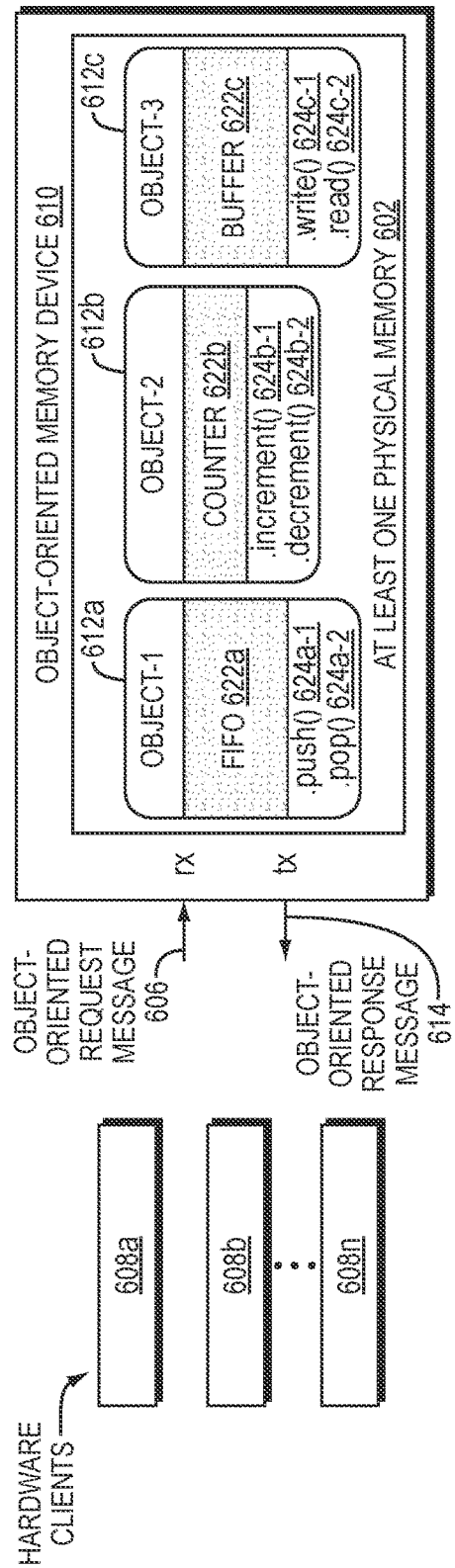
FIG. 6 is a block diagram of an example embodiment of an object-oriented memory device with a first-in first-out (FIFO) object, counter object, and buffer object instantiated in at least one physical memory.

FIG. 6 is a block diagram of an object-oriented memory device 610 with a first-in first-out (FIFO) object 612a (i.e., Object-1), counter object 612b (i.e., Object-2), and buffer object 612c (i.e., Object-3) stored in at least one physical memory 602. It should be understood that objects stored in the at least one physical memory 602 are not limited to a FIFO object, counter object, buffer object, or combination thereof. The object-oriented memory device 610 may be implemented as the object-oriented memory device 110, object-oriented memory device 210, or object-oriented memory device 310 of FIG. 1B, FIG. 2, and FIG. 3, respectively, disclosed above, or other object-oriented memory device disclosed herein.

In the example embodiment of FIG. 6, the FIFO object 612a includes a FIFO data member 622a, push method 624a-1, and pop method 624a-2. The counter object 612b includes a counter data member 622b, an increment method 624b-1, and a decrement method 624b-2. The buffer object 612c includes a buffer data member 622c, a write method 624c-1, and a read method 624c-2. An object-oriented request message 606 may be transmitted by a given hardware client, of the hardware client 608a, hardware client 608b, or hardware client 608n, to call a method of a respective object instantiated in the at least one physical memory 602.

In an event the given hardware client is associated with the respective object, the hardware controller (not shown) of the object-oriented memory device 610 may, in turn, execute the method called via the object-oriented request message 606 and such execution may manipulate data of a respective data member of the respective object. For example, the object-oriented request message 606 may be a call to the push method 624a-1 of the FIFO object 612a and may include data for same. The hardware controller may push the data to the FIFO object 612a by executing the push method 624a-1 that may push the data to the FIFO data member 622a. The object-oriented request message 606 may be a call to the pop method 624a-2 of the FIFO object 612a. The hardware controller may pop data from the FIFO object 612a by executing the pop method 624a-2 that may pop data from the FIFO data member 622a and return same to the hardware client via the object-oriented response message 614.

The object-oriented request message 606 may be a call to the increment method 624b-1 or decrement method 624b-2 of the counter object 612b. The hardware controller may increment or decrement a counter value of the counter data member 622b by executing the increment method 624b-1 or decrement method 624b-2, respectively, and may, optionally, return a status of such execution to the hardware client via the object-oriented response message 614. The status may, for example, indicate success, counter underflow, counter overflow, or any other status that may be related to such execution.

The object-oriented request message 606 may be a call to the write method 624c-1 and may specify data for same or may be a call to the read method 624c-2 of the buffer object 612c. The hardware controller may write or read a data value of the buffer data member 622c by executing the write method 624c-1 or read method 624c-2, respectively, and may, optionally, return a result of such execution to the hardware client via the object-oriented response message 614. For example, the result may be the data value returned by the read method 624c-2 or may indicate success/failure or another result. According to an example embodiment, the buffer object 612c may serve as a private buffer for the hardware client, as disclosed below with regard to FIG. 7.

Figure 7:
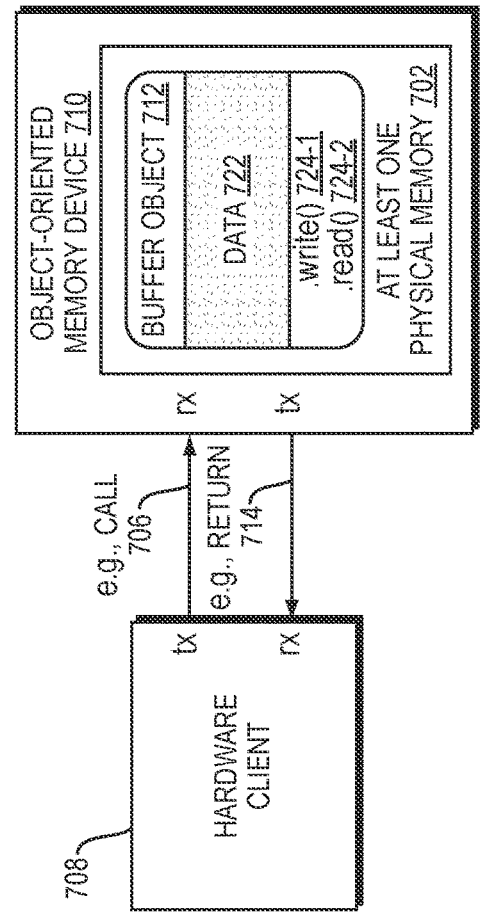
FIG. 7 is a block diagram of an example embodiment of an object-oriented memory device with a buffer object instantiated in at least one physical memory.

FIG. 7 is a block diagram of an example embodiment of an object-oriented memory device 710 with a buffer object 712 instantiated in at least one physical memory 702. The buffer object 712 includes a buffer data member 722, a write method 724-1, and a read method 724-2. The buffer object 712 may be a private storage buffer employed by a hardware process, such as the hardware client 708. A hardware controller, such as the hardware controller 104 of FIG. 1B, disclosed above, is included in the object-oriented memory device 710 and, in response to receiving an object-oriented message 706 (e.g., call) from the hardware process, may perform an action that may include accessing the private storage buffer for the hardware process.

For example, the hardware process may be single process that needs a private storage buffer, such as a small block of memory that is only relevant to the hardware process and format of data within the buffer may only be known to the hardware process. It is expected that the process will store and retrieve data at will and, as such, the buffer object 712 includes the write method 724-1 and read method 724-2 that may be called by the hardware client 708 via the object-oriented message 706 and executed by the hardware controller. Additional operations could include reset-buffer-to-zero, basic ALU operations to read-modify-write data, an analysis function for a reduction-XOR to generate parity, etc.

A buffer class (not shown) that defines the buffer object 712 may be parameterized for size as buffer size requirements of the hardware client 708 or other hardware clients (not shown) may vary. The methods of the buffer object, such as the write method 724-1, read method 724-2, or another method may return an indication of success/failure that may be included within the response 714 (e.g., return). Such methods may employ arguments and the values associated with same may be included in the object-oriented message 706.

Referring back to FIG. 1B, it may be that a hardware process, such as the hardware client 108, may be configured to check and/or correct data in a given payload when implementing pipelined operations. This typically looks like single-bit parity (simple XOR), cyclic redundancy check (CRC) codes, or error-correcting code (ECC) parity. According to an example embodiment, the object 112 may be an error-correcting code ECC object, such as the ECC object 812 of FIG. 8, disclosed below.

Figure 8:
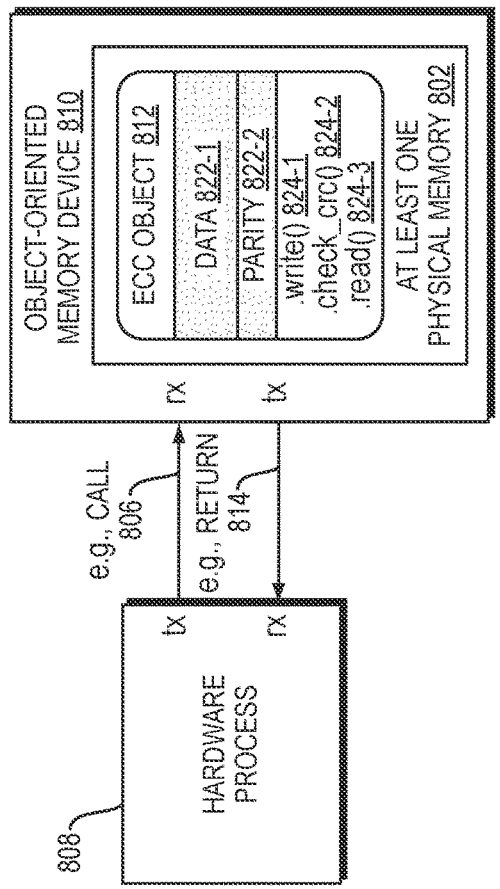
FIG. 8 is a block diagram of an example embodiment of an object-oriented memory device with an error-correcting code (ECC) object instantiated in at least one physical memory.

FIG. 8 is a block diagram of an example embodiment of an object-oriented memory device 810 with an ECC object 812 instantiated in at least one physical memory 802. The ECC object 812 includes multiple data members, namely, data 822-1 and parity 822-2, as well as multiple methods, namely a write method 824-1, check_crc method 824-2, and read method 824-3. In response to receiving the object-oriented message 806, the hardware controller (not shown) of the object-oriented memory device 810 may perform an action that includes employing the ECC object 812 to apply ECC correction on a payload (not shown) for the hardware process 808 and may return a response 814 based on execution of such ECC correction. The payload may be included in the object-oriented message 806 received.

Referring back to FIG. 1B, according to an example embodiment, the object 112 may be a first-in first-out (FIFO) object. The hardware controller 104 may be further configured to manage a read pointer (not shown) and write pointer (not shown) to the FIFO object, exclusively, intra the object-oriented memory device 110. The hardware controller 104 may be further configured to determine an empty status (not shown) or full status (not shown) for the FIFO object based on the read and write pointers and, in an event it is determined that the FIFO object is full, the hardware controller 104 may be further configured to notify the hardware client 108 via a notification message (not shown) that is transmitted to the hardware client 108 via the message bus 118.

The action performed may include pushing data to the FIFO object and updating the write pointer. The data pushed may be included in the object-oriented message 106 received. The hardware controller 104 may be further configured to notify another hardware client (not shown) in response to pushing the data for the hardware client 108. The hardware controller 104 may be further configured to notify the hardware client 108 in an event another object-oriented message (not shown) is received from another hardware client (not shown) and data is pushed to the FIFO object by the hardware controller 104 in response to same.

The action performed may include popping data from the FIFO object. The hardware controller 104 may be further configured to return the data popped in a response message, such as the response 114, that is transmitted to the hardware client 108 and the hardware controller 104 may be further configured to update the read pointer. An example embodiment of a use of the FIFO object is disclosed below with regard to FIG. 9.

Figure 9:
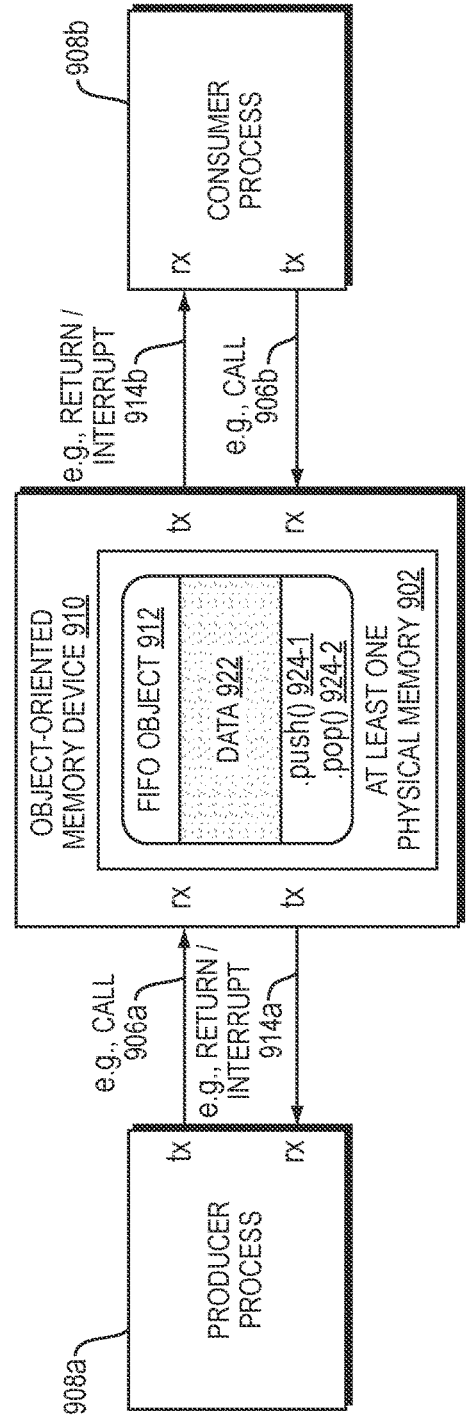
FIG. 9 is a block diagram of an example embodiment of an object-oriented memory device with a FIFO object instantiated in at least one physical memory.

FIG. 9 is a block diagram of an example embodiment of an object-oriented memory device 910 with a FIFO object 912 instantiated in at least one physical memory 902. The FIFO object 912 is first-in first-out type object as opposed to a last-in first-out (LIFO) type object, such as the stack object 1012 of FIG. 10, disclosed further below. The FIFO object 912 of FIG. 9 includes at least one data member, namely, data 922, as well as multiple methods, namely a push method 924-1 and a pop method 924-2. In the example embodiment, the producer process 908a may push a series of fixed-size data items to the FIFO object 912 by transmitting a series of object-oriented messages, including the object-oriented message 906a, that may be requested for calling the push method 924-1.

Such data items pushed by the producer process 908a may be stored in the at least one data member 922 of the FIFO object 912 and consumed by another process, such as the consumer process 908b. The consumer process 908b may consume the data items by sending a series of object-oriented messages, including the object-oriented message 906b, that may be requested for calling the pop method 924-2 and such data items may be returned to the consumer process 908b via object-oriented responses, such the response 914b. The FIFO object 912 may include methods for auto-calculating any pointers and managing empty and full scenarios.

The FIFO object 912 may be further configured to generate interrupts for the producer process 908a or consumer process 908b based on FIFO object activity and such interrupts may be communicated as object-oriented messages transmitted from the hardware controller (not shown) to the producer process 908a or consumer process 908b. According to an example embodiment the FIFO object 912 may fail or stall (block) on push-to-full or pop-from-empty type scenarios. Such failure may be communicated as an object-oriented message that is transmitted by the hardware controller to the producer process 908a, consumer process 908b, or a combination thereof. Such an object-oriented message may include a handle to the FIFO object 912 and an indication of the type of failure.

Referring back to FIG. 1B, the object 112 may be a stack object, such as the stack object 1012 of FIG. 10, disclosed below.

Figure 10:
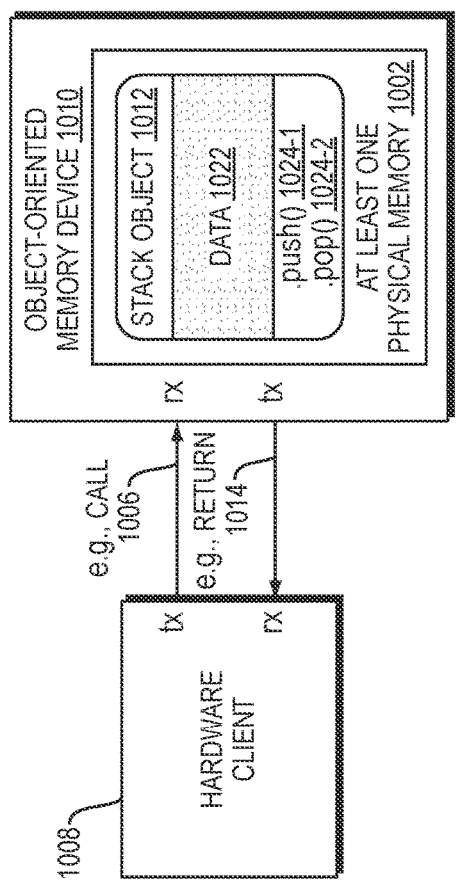
FIG. 10 is a block diagram of an example embodiment of an object-oriented memory device with a stack object instantiated in at least one physical memory.

FIG. 10 is a block diagram of an example embodiment of an object-oriented memory device 1010 with a stack object 1012 instantiated in at least one physical memory 1002. According to an example embodiment, the stack object is a LIFO type object. The stack object 1012 includes at least one data member, namely, data 1022, as well as multiple methods, namely a push method 1024-1 and a pop method 1024-2. It should be understood that the stack object 1012 may include additional methods, such as methods for retrieving a current depth of the data 1022 or for filling the data 1022 from a buffer object, such as from the buffer object 712 disclosed above with regard to FIG. 7, or to copy the data 1022 to another object, such as to the buffer object 712.

Continuing with FIG. 10, according to an example embodiment, an action performed by the hardware controller (not shown) of the object-oriented memory device 1010 may be based on the object-oriented message 1006 that is received and decoded and such action may include saving nested thread context (not shown) to the stack object 1012 for the hardware client 1008. The nested thread context may be included in the object-oriented message 1006 received and may be stored in the data 1022. The stack object 1012 may include the push method 1024-1 that may be employed by the hardware controller to store the nested thread context. The response 1014 may be an object-oriented message that includes the handle (not shown) of the stack object 1012 and may return at least a portion of the nested thread context that may be retrieved by the hardware controller via the pop method 1024-2. The hardware controller may save/retrieve the nested thread context in first-in last-out (FILO) order, as opposed to the FIFO order employed by the FIFO object 912 of FIG. 9, disclosed above, or the FIFO objects of FIG. 11, disclosed below.

Figure 11:
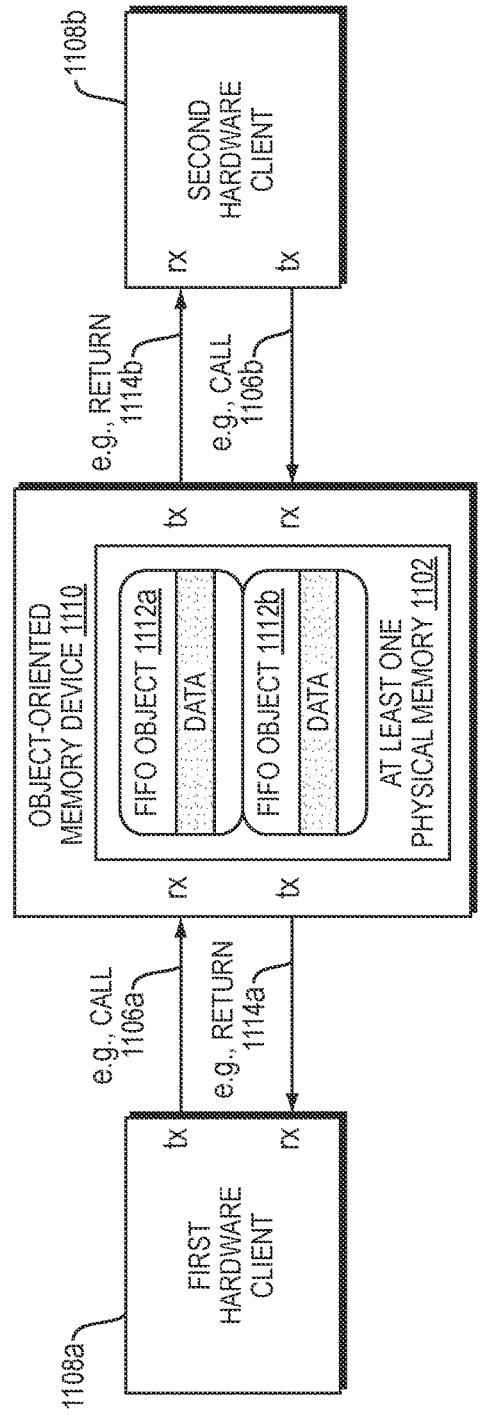
FIG. 11 is a block diagram of an example embodiment of an object-oriented memory device with FIFO objects instantiated in at least one physical memory and employed for bi-directional messaging between hardware clients of the object-oriented memory device.

FIG. 11 is a block diagram of an example embodiment of an object-oriented memory device 1110 with FIFO objects instantiated in at least one physical memory 1102 and employed for bi-directional messaging between hardware clients of the object-oriented memory device 1110, namely the first hardware client 1108a and the second hardware client 1108b. The FIFO objects include a first FIFO object 1112a and a second FIFO object 1112b. A hardware controller (not shown) object-oriented memory device 1110, such as the hardware controller 104 of FIG. 1B, disclosed above, may be further configured to enable bi-directional communication between the first hardware client 1108a and second hardware client 1108b by managing the first FIFO object 1112a and second FIFO object 1112b intra the object-oriented memory device 1110.

The hardware controller may be configured to generate an unsolicited message (not shown) and to broadcast the unsolicited message to the first hardware client 1108a and second hardware client 1108b. The unsolicited message may indicate that the first FIFO object 1112a and second FIFO object 1112b are available for bi-directional communication between the first hardware client 1108a and second hardware client 1108b.

The first FIFO object 1112a may be used for communication in a direction from the first hardware client 1108a to the second hardware client 1108b. The first hardware client 1108a may transmit an object-oriented message 1106a that is received and decoded by a hardware controller (not shown) of the object-oriented memory device 1110. The hardware controller may decode the object-oriented message 1106a received and perform an action for the hardware client 1108 by calling a push method (not shown) of the first FIFO object 1112a to push data received from the first hardware client 1108a thereto. The hardware controller may generate an interrupt to the second hardware client 1108b that may be an object-oriented message 1114b that is transmitted to the second hardware client 1108b.

The second hardware client 1108b may service the interrupt, transmitted as the object-oriented message 1114b, and transmit an object-oriented message 1106b to the object-oriented memory device 1110 with a handle to the first FIFO object 1112a and request to call a pop method of the first FIFO object 1112a. The hardware controller may execute the pop method and return data from the first FIFO object 1112a to the second hardware client 1108b, thereby passing a message from the first hardware client 1108a to the second hardware client 1108b.

Similarly, the hardware controller may decode the object-oriented message 1106b received from the second hardware client 1108b and perform an action for second hardware client 1108b by calling a push method (not shown) of the second FIFO object 1112b to push data received from the second hardware client 1108b thereto and may generate an interrupt to the second hardware client 1108b that may be the object-oriented message 1114a that is transmitted to the first hardware client 1108a.

The first hardware client 1108a may service the interrupt, transmitted as the object-oriented message 1114a, and transmit an object-oriented message 1106a to the object-oriented memory device 1110 with a handle to the second FIFO object 1112b and request to call a pop method of the second FIFO object 1112b. The hardware controller may execute the pop method and return data from the second FIFO object 1112b to the second hardware client 1108b, thereby passing a message from the second hardware client 1108b to the first hardware client 1108a.

According to an example embodiment, entries in FIFOs may be handles to other "message" objects that include data for communicating between hardware clients. According to another example embodiment, either of the FIFOs, namely the first FIFO object 1112a or the second FIFO object 1112b may include a method to fast-zero/empty such message objects for recycling.

FIG. 12 is a block diagram of an example embodiment of an object-oriented memory device 1210 with a notification object 1212 instantiated in at least one physical memory 1202 and may be employed by hardware clients of the object-oriented memory device 1210 for alerting one another. For example, in the example embodiment, a main process 1208a may employ the notification object 1212 to broadcast a notification to a subscriber process 1208b that may be a plurality of subscriber processes that are each subscribed to the notification object 1212.

The notification object 1212 includes at least one data member, namely, data 1222, as well as multiple methods, namely a subscribe method 1224-1 and a write method 1224-2. The subscriber process 1208b may subscribe to received alerts from the main process 1208a by transmitting an object-oriented message 1206b to the object-oriented memory device 1210 with a handle (not shown) of the notification object 1212 and call to the subscribe method 1224-1.

Similarly, the subscriber process 1208b may unsubscribe for such alerts by transmitting an object-oriented message 1206b to the object-oriented memory device 1210 with a handle (not shown) of the notification object 1212 and call to an un-subscriber method (not shown) of the notification object 1212. The main process 1208a may be alerted of such un-subscription via the object-oriented message 1214a.

The main process 1208a may generate an alert by transmitting an object-oriented message 1206a with a call to the write method 1224-2 which, in turn, may cause a hardware controller of the object-oriented memory device 1210 to execute same and transmit an interrupt to the subscriber process 1208b via the object-oriented message 1214b. As such, the notification object 1212 may be employed by a hardware process, such as the main process 1208a, to alert the subscriber process 1208b in a form of a "ring the bell" type interrupt or another message that may be communicated to the subscriber process 1208b. Such notifications may include a process identifier (PID) to uniquely identify source and target processes. An argument of the subscribe method 1224-1 may include a corresponding PID that identifies the subscribing process. The notifications/interrupts may be communicated as unsolicited read response/return object-oriented messages.

As disclosed above with regard to FIG. 1B, the OOMem model may define an "API" that is a message passing interface in which a message is targeted to, or produced by, a method of the object 112. According to an example embodiment, an example set of message transactions for creating the object 112 include the object-oriented message 106 that may be a request made from the hardware client 108 in which the hardware client 108 requests to handle creation for the object 112 of a given class <class>. The object-oriented memory device 110 may respond with the response 114 that may include the <handle> value. The hardware client 108 may transmit a subsequent object-oriented message 106 that is a method request of <handle>.allocate (<size>) to instantiate the object with a buffer of <size> to which the object-oriented memory device 110 may respond with the response 114 that may indicate status=success.

Following such object instantiation, the object 112 may be used. For example, the hardware client 108 may write via a method request for <handle>.write buffer(<offset>,<data>) and, in turn, the object-oriented memory device 110 may store the data in the at least one physical memory 102 and respond with status=success. Another hardware client (not shown) may read via a method request for <handle>.read buffer(<offset>) and, in turn, the object-oriented memory device 110 may transmit a response with <data>. As disclosed above, the object 112 is defined by an object class. Table 3, below, is an example embodiment of a listing of a few object classes; however, it should be understood that an object class is not limited to an object class of Table 3, below.

TABLE 3

Example Object Classes

| Class | Description |
| --- | --- |
| Buffer | Simple read/write buffer, much like a linear block memory. |
| Queue | FIFO with internal pointers. Push to back. Pop from front. |
| Stack | Similar to Queue, but FILO instead of FIFO. |
| Broadcast | Multiple clients can subscribe to receive updates on data value changes. |

Further, as disclosed above, the object class defines at least one method for the object. Table 4, below, is an example embodiment of a listing of a few object methods; however, it should be understood that an object method is not limited to an object method of Table 4.

TABLE 4

| Method | Description |
| --- | --- |
| allocate ( ) | Instantiate the object buffer of <size> bytes. |
| deallocate ( ) | Un-instantiate the buffer. |
| size ( ) | Return the <size> of the buffer. |
| write ( ) | Write <size> bytes of <data> to the buffer at <offset>. |
| read ( ) | Read <size> bytes of <data> from the buffer at <offset>. |
| push ( ) | Write <size> bytes of <data> to buffer at <push_pointer>. |
| pop ( ) | Read <size> bytes of <data> from the buffer at <pop_pointer>. |
| mip ( ) | Modify-In-Place. A write operation to the buffer with arithmetic logic unit (ALU) features (e.g., and/or/xor). |
| copy ( ) | Memcpy: create a new object instance that is a copy of an existing object instance and provide a handle thereto. |
| crc_gen ( ) | Generate a CRC for data provided. |
| crc_check ( ) | Verify a CRC for data provided. |

Referring back to FIG. 1B, the object-oriented memory device 110 comprises the at least one physical memory 102 and the hardware controller 104. The hardware controller 104 is coupled intra the object-oriented memory device 110 to the at least one physical memory 102 and is configured to communicate with at least one hardware client, namely the hardware client 108, based on object-oriented message transactions, such as the object-oriented message 106 and response 114. The object-oriented message transactions enable the at least one hardware client 108 to read and write data to the at least one physical memory 102 in lieu of address-data based memory read and write transactions.

According to an example embodiment, the object-oriented messages exchanged between the hardware client 108 and the object-oriented memory device 110 may be of a plurality of types including a request, response, and notification type. There may be multiple requests outstanding, simultaneously. The requests may be serviced by the object-oriented memory device 110 out-of-order for the sake of performance.

According to an example embodiment, an object-oriented message of the request type is a method call. Such a request includes fields necessary for the method to run. Table 5, below, is an example embodiment of a listing of fields of an object-oriented message. It should be understood, however, that fields of an object-oriented message, such as the object-oriented message 106 of FIG. 1B, disclosed above, are not limited to fields of Table 5, below.

TABLE 5

| Field | Description |
|---|---|
| message type | e.g., request, response, or a notification. |
| process ID | The ID of the requesting process. Used for associativity and authorization. |
| process tag | A pass-through value allowing a process to associate a response with its request. |
| object ID | The handle of the object that is the target of the call. |
| method ID | The method to run. The value here will be consistent across all classes that have this method. For example, ".pop( )" has the same ID for both FIFO and Stack objects, etc. |
| argument list | The list and meaning of arguments specific to each method. |

According to an example embodiment, an object-oriented message response may be generated in response to a method return and may correspond to a specific request. Table 6, below, is an example embodiment of a listing of fields of an object-oriented message response. It should be understood, however, that fields of an object-oriented message response, such as the object-oriented message response 114 of FIG. 1B, disclosed above, are not limited to fields of Table 6, below.

TABLE 6

| Field | Description |
|---|---|
| message type | Same as Request |
| process ID | Same as Request |
| process tag | Same as Request |
| object ID | Same as Request |
| method ID | Same as Request |
| exit value | Indicate if the request completed successfully or if something else happened. |
| argument list | The list and meaning of arguments specific to each method. |

An object-oriented message of the notification type may function as an interrupt with context. Such notifications may appear as unsolicited responses and enable the object-oriented memory device 110 to volunteer information to hardware clients. For example, the producer and consumer processes of FIG. 9, disclosed above, could each get a notification when the FIFO object 912 has been configured enabling communication therebetween. A format of a notification type object-oriented message may be identical to a format of an object-oriented message of a response type with the only difference being a value employed in the message type field.

According to an example embodiment, the at least one physical memory 102 may have at least one object instantiated therein following power-up of the object-oriented memory device and the at least one object may be instantiated by the hardware controller 104 absent a hardware client request for same. Such a default object that is auto-instantiated by the hardware controller 104 may be referred to herein as an "admin object" and such an object has unique methods that may be used to declare all other objects to be instantiated in the object-oriented memory device 110. Such an admin object effects an "object.method" communication paradigm for messages. According to an example embodiment, the admin object constructs other objects that are static and self-managed by the object-oriented memory device 110.

According to an example embodiment, pseudo-code for a FIFO declaration may include:
 #Use the admin object to create a new object of the FIFO class.
 #Any process may do this.
 fifo_obj=admin_obj.declare(C_FIFO).
It should be understood, however, that error checking etc. has been skipped in the above pseudo-code for the sake of brevity. Further, it should be understood that pseudo-code presented herein is for example purposes and is non-limiting.

According to an example embodiment, object declaration may create a handle for the object 112 but not allocate resources or data space. The next step is to construct the object 112, feeding it any parameter arguments it might need to be built. Below is an example embodiment of pseudo-code for same:
 #Construct the object with whatever parameters make sense.
 fifo_obj.construct(size=1024).
Assuming that the producer and consumer processes are ready and waiting for their respective interrupts/notifications to start running, their runtime interaction with a FIFO object, such as the FIFO object 912 of FIG. 9, disclosed above, might look like:
 #Somewhere in a ProcP loop . . .
 if (! fifo_obj.is_full( ))
  fifo_obj.push(data=XYZ)
 #Somewhere in a ProcC loop . . .
 if (! fifo_obj.is_empty( ))
  data=fifo_obj.pop( )
There will, of course, be more detail to the run interaction, particularly in terms of flow control (FIFO is empty or full). It should be understood that the exact run interaction flow depends on the object class and its use case. Disclosed below are example embodiments of classes.

Class—C_NULL

According to an example embodiment, the object-oriented memory device 110 may include a base class (not extended) that may be used for all other object classes but cannot be instantiated. Such a base class may be referred to herein as C_NULL and may be included in a class library, such as the class library 526 of FIG. 5, disclosed above.

C_NULL—Properties

According to an example embodiment, properties may be named integer values accessed via .set_prop( ) and .get_prop( )methods. They may be assigned during construction to either a respective default value or an override argument to .construct( ) Properties may be modified via .set_prop( ) unless noted otherwise herein. Table 7 includes an example embodiment of a class property.

TABLE 7

| Property | Default | Description |
|---|---|---|
| class | intrinsic class ID | Read-only. This is the enumerated class ID of an object. This property allows us to query the class of an object via .get_prop( arg_class ). Undeclared objects will return C_NULL to indicate a null pointer. |

C_NULL—Data
There is no data for this class.
C_NULL—Methods
Note: Methods arguments, both for call/request and return/response, are formatted as key-value pairs, as disclosed in Table 8, below. The notation "arg_foo" implies "key_foo=value_foo." This formatting allows arguments to be passed to/from methods in an arbitrary order and still be correctly identified. This provides, in turn, the ability to omit arguments (use default values) for shorter messages and the ability to add new argument options in the future without breaking backward compatibility.

TABLE 8

| Method | Description |
| --- | --- |
| .set_prop | Set/write properties. Call arguments may be any/all modifiable properties. Return has no arguments. |
| .get_prop | Get/read properties. Call arguments may be any/all modifiable properties (value is ignored). Return arguments mirror call arguments but with read values. |

C_NULL—Arguments
Note: Most arguments will have default values and are, thus, optional. A "-" as default indicates a "don't care" where the value is either ignored or is non-optional, as indicated in Table 9, below.

TABLE 9

| Argument | Default | Description |
| --- | --- | --- |
| arg_class | — | The class property. |

Class—C_ADMIN
Extends C_NULL. The object-oriented memory device has one already-constructed object of C_ADMIN class. This is the utility object and may be restricted to a single instance per object-oriented memory device (i.e., cannot declare another one).
C_ADMIN—Properties

TABLE 10

| Property | Default | Description |
| --- | --- | --- |
| num_objects | — | Read-only. The maximum number of objects (handle) that are tracked by this OOMem instance. handle==0 is reserved for the admin object. The value of this property is implementation specific. |

C_ADMIN—Data
There is no data for this class.
C_ADMIN—Methods

TABLE 11

| Method | Description |
| --- | --- |
| .declare | Creates a handle for an object of arg_class. Call arguments are arg_class. Return arguments are arg_handle. |
| .revoke | Reserved for future use. |

C_ADMIN—Arguments

TABLE 12

| Argument | Default | Description |
| --- | --- | --- |
| arg_num_objects | — | The num_objects property. Request value is ignored. |
| arg_handle | — | The return value of the .declare( ) method. |

Class—C_BYTES
Extends C_NULL. This is the base class for objects that use a packed list of bytes as main data.
C_BYTES—Properties

TABLE 13

| Property | Default | Description |
| --- | --- | --- |
| num_bytes | 64 | Number of bytes in bytes[ ] data. |
| length | 0 | Length (in bytes) of access to/from bytes[ ]. |
| write_offset | 0 | Default offset for next write access. |
| read_offset | 0 | Default offset for next read access. |

C_BYTES—Data

TABLE 14

| Data | Type | Default | Description |
| --- | --- | --- | --- |
| bytes[ ] | packed array | zeros | A linear list/array of data bytes [size-1:0]. |

C_BYTES—Methods

TABLE 15

| Method | Description |
| --- | --- |
| .construct | The first method to call for any declared object. This will set the initial values of all properties and allocate memory for the object. Call arguments may be any/all modifiable properties. Return has no arguments. |
| .destruct | Inverse of construct, returning the object to a "just declared" state. There are no arguments to either call or return. |
| .write | Writes data into bytes[ ], "little-endian" (ascending from arg_write_offset). Call arguments are arg_length, arg_write_offset, and arg_bytes[ ]. Return has no arguments. Post-access updates: write_offset += arg_length and length=arg_length. |
| .read | Read data from bytes[ ]. Reads are "little-endian" like writes. Call arguments are arg_length and arg_read_offset. Return arguments are arg_data[ ]. Post-access updates: read_offset += arg_length and length=arg_length. |

According to an example embodiment, when the number of bytes in arg_bytes[ ] does not match arg_length, the behavior may be as follows:

arg_length<length(arg_bytes[ ])→internally truncate arg_bytes[ ] to match arg_length arg_length>length(arg_bytes[ ])→internally zero-extend arg_bytes[ ] to match arg_length.

Note: An out of bounds request (ex. arg_offset+arg_length>=num_bytes) will result in an error response with no update to internal parameters or data. In other words, boundaries are strictly enforced here.

C_BYTES—Arguments

TABLE 16

| Argument | Default | Description |
|---|---|---|
| arg_num_bytes | num_bytes | Mandatory argument to .construct( ). |
| arg_length | length | The length (in bytes) of desired access to/from bytes[ ]. |
| arg_write_offset | write_offset | The offset at which to start the write access. |
| arg_read_offset | read_offset | The offset at which to start the read access. |
| arg_bytes[ ] | — | Mandatory. The array of bytes for write or from read. |

Class—C_FIFO

Extended from C_BYTES. The C_FIFO class is a simple first-in-first-out buffer.

Note: The anticipated use case assumes that an object of this class will be constructed with the desired arg_length so that this argument is pre-defined and omitted from push/pop requests.

C_FIFO—Properties

TABLE 17

| Property | Default | Description |
|---|---|---|
| num_valid | 0 | Read-only. Number of bytes filled/valid in the FIFO. |
| is_empty | 1 | Read-only. is_empty = (num_valid==0) |
| is_full | 0 | Read-only. is_full = (num_valid==num_bytes) |

C_FIFO—Data
Same as parent class.
C_FIFO—Methods

TABLE 18

| Method | Description |
|---|---|
| .push | A .write( ) to write_offset. Fails if resultant num_valid would exceed num_bytes. Call arguments are arg_length and arg_bytes[ ]. Return has no arguments. Post-access updates: num_valid+=arg_length. |
| .pop | A .read( ) from read_offset. Fails if resultant num_valid would be negative. Call arguments are arg_length. Return arguments are arg_data[ ]. Post-access updates: num_valid−=arg_length. |

Note: C_FIFO treats bytes[ ] as a circular queue. This means that the offsets will automatically "wrap" to a lower value when they would exceed num_bytes-1.

C_FIFO—Arguments

TABLE 19

| Argument | Default | Description |
|---|---|---|
| arg_num_valid | — | The num_valid property. Request value is ignored. |
| arg_is_emtpy | — | The is_empty property. Request value is ignored. |
| arg_is_full | — | The is_full property. Request value is ignored. |

As disclosed above with regard to FIG. 1B, objected-oriented messages exchanged with the object-oriented memory device 110 are encoded. Examples of same are disclosed below.

Figure 13A:
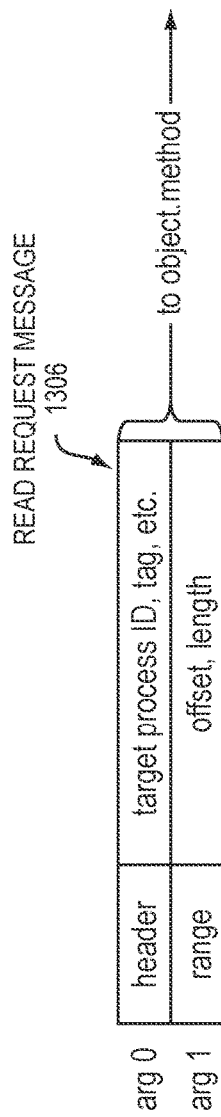
FIG. 13A is a block diagram of an example embodiment of read request message.

FIG. 13A is a block diagram of an example embodiment of read request message 1306. The read request message 1306 is formatted as a list of arguments and the arguments are formatted as key-value pairs.

Figure 13B:
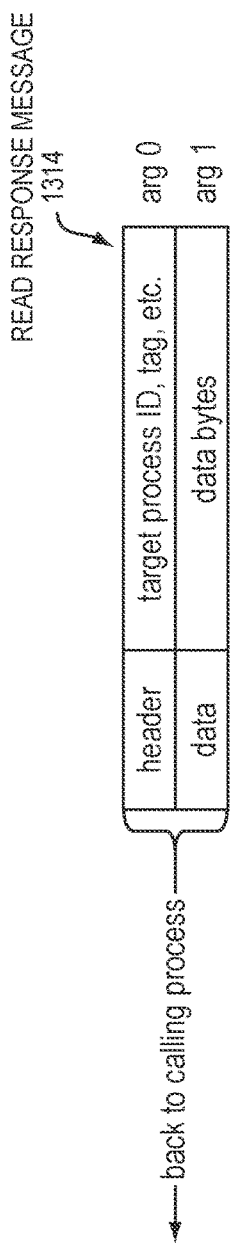
FIG. 13B is a block diagram of an example embodiment of a read response message.

FIG. 13B is a block diagram of an example embodiment of a read response message 1314. The read response message 1314 is formatted as a list of arguments and the arguments are formatted as key-value pairs.

According to an example embodiment, message fields may be of a fixed-size. The argument key-value pair may also be of fixed-size; however, a length of the list may be unbounded. As such, it may be wire-efficient for the object-oriented memory device to transmit messages over multiple cycles (i.e., a streaming bus).

Table 20, below, is an example embodiment of field encoding.

TABLE 20

| Field | Short | Bits | Note |
|---|---|---|---|
| process ID | pid | 16 | Integer. For object methods, their PID = (objectID + methodID). |
| process tag | ptag | 8 | Integer. Meaning is known only to the requesting process. |
| object ID | oid | 10 | Integer. oid==0 is reserved for the admin object |
| method ID | mid | 6 | Enum. Values listed below. |
| exit value | eval | 4 | Enum. Values listed below. |
| argument list | argkey | 8 | Arguments are in the form of key-value pairs. |
| | argval | 32 | |

Note:
The ptag in notification messages may be set to zero as there is no request tag to reflect/pass-through.

Figure 14:
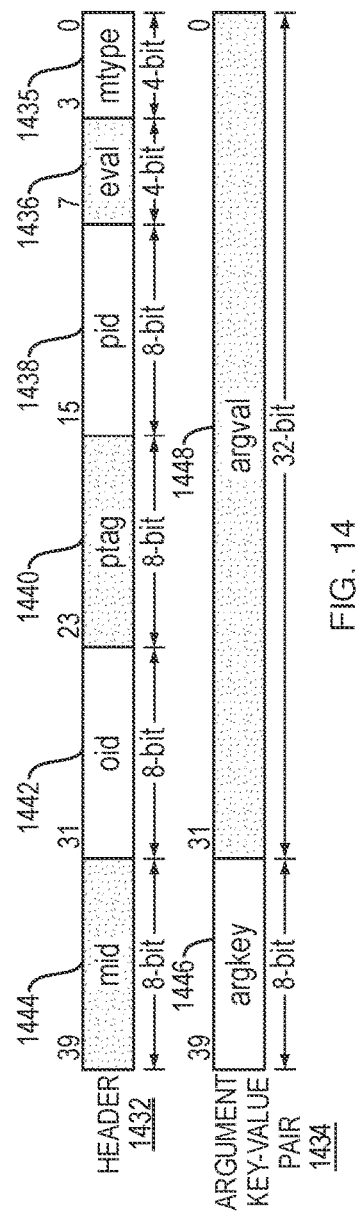
FIG. 14 is a block diagram of an example embodiment of a header and argument key-value pair of an object-oriented message disclosed herein.

FIG. 14 is a block diagram of an example embodiment of a header 1432 and argument key-value pair 1434 of an object-oriented message disclosed herein. In the example embodiment, the header 1432 and argument key-value pair 1434 are both 40-bits wide and are packed as disclosed. It should be understood, however, that the header 1432 and argument key-value pair 1434 are not limited to being 40-bits wide and are not limited to being packed as disclosed in FIG. 14. Table 21, disclosed below, includes an example embodiment of the message type (mtype) 1435 of the header 1432.

TABLE 21

| Enum Member | Value(h) | Note |
|---|---|---|
| T_REQ | 0 | Request message. |
| T_RSP | 1 | Response message. |
| T_NTF | 2 | Notification message. |
| (reserved) | — | Values reserved for future use. Note: additional fixed fields may be added to messages. For example, a footer with CRC parity for data integrity, etc. |

Table 22, disclosed below, includes an example embodiment of the exit value (eval) 1436 of the header 1432.

TABLE 22

| Enum Member | Value(h) | Note |
|---|---|---|
| X_SUCCESS | 0 | General success. |
| X_FAILURE | 1 | General error. |
| X_RETRY | 2 | Object was busy. Indicative of bandwidth imbalance. |

TABLE 22-continued

| Enum Member | Value(h) | Note |
|---|---|---|
| X_ERR_OBJECT | 3 | There is no such object. |
| X_ERR_METHOD | 4 | The object has no such method or is not yet constructed. |
| X_ERR_ARGS | 5 | The method could not validate the arguments. |
| X_ERR_RANGE | 6 | A part of the access was out of range. |
| (reserved) | — | Values reserved for future use. |

The process ID (pid) 1438 in the header 1432 may be a binary encoding of the numeric source/target process identifier; however, it should be understood that the pid 1438 is not limited to a binary encoding. According to an example embodiment, a pid value of 0 may represent a "default/admin process." The object-oriented memory device may target this process for anything that does not already have a connected process. For example, with reference to FIG. 1B, disclosed above, this could happen if the hardware controller 104 detects an uncorrectable error in the at least one physical memory 102 and, according to an example embodiment, may be an indication that firmware running external to the object-oriented memory device 110 should handle same.

The process tag (ptag) 1440 may be a numeric value that allows a process to associate responses with requests. The object ID (oid) 1442 may be a binary encoding of the numeric object handle/pointer, wherein the admin object may be associated with oid=0. It should be understood, however, that the oid 1442 associated with the admin object may have another value that is different from 0.

Table 23, below, is an example embodiment of a listing of method ID (mid) 1444 values associated with enum members. It should be understood, however, that the mid 1444 enum members and associated values are not limited to as disclosed in Table 23, below.

TABLE 23

| Enum Member | Value(h) | Note |
|---|---|---|
| M_SET_PROP | 00 | From C_NULL |
| M_GET_PROP | 01 | From C_NULL |
| M_DECLARE | 02 | From C_ADMIN |
| (reserved) | 03 | Reserved (e.g., for M_REVOKE) |
| M_CONSTRUCT | 04 | From C_NULL |
| M_DESTRUCT | 05 | From C_NULL |
| M_WRITE | 06 | From C_BYTES |
| M_READ | 07 | From C_BYTES |
| M_PUSH | 08 | From C_FIFO |
| M_POP | 09 | From C_FIFO |
| (reserved) | — | Values reserved for future use. |

Table 24, below, is an example embodiment of a listing of enum members and associated values for the argument key (argkey) 1446 of the argument key-value pair 1434. It should be understood, however, that the argkey 1446 is not limited to same.

TABLE 24

| Enum Member | Value(h) | Note |
|---|---|---|
| K_CLASS | 00 | From C_NULL |
| K_NUM_OBJECTS | 01 | From C_ADMIN |
| K_HANDLE | 02 | From C_ADMIN |
| K_NUM_BYTES | 03 | From C_BYTES |
| K_LENGTH | 04 | From C_BYTES |
| K_WRITE_OFFSET | 05 | From C_BYTES |
| K_READ_OFFSET | 06 | From C_BYTES |
| K_BYTES | 07 | From C_BYTES |
| K_NUM_VALID | 08 | From C_FIFO |
| K_IS_EMPTY | 09 | From C_FIFO |
| K_IS_FULL | 0A | From C_FIFO |
| (reserved) | — | Values reserved for future use. |

According to an example embodiment, the argument value (argval) 1448 of the argument key-value pair 1434 may depend on the argument type (e.g., a class ID or property value). When the value to be communicated matches the argval width (e.g., properties), then this works simply with one cycle of argkey→argval. When the communicated value, for example, a 16-bit object handle, is narrower than the argval width, then the unused argval bits may be set to 0 (zero-extend). When the communicated value is larger than the argval width, then the communicated value may be spread over multiple bus cycles. In this case, multiple arguments of the same type, may be communicated in ascending (little-endian) order.

For example, for a case in which 64B of data (0xFEDC_BA98_7654_3210) is to be written to offset 0xFACE of a C_BYTES object, the request message cycles may be as disclosed in Table 25, below. It should be understood, however, that the request message cycles are not limited to same.

TABLE 25

| Cycle | 39:32 | 31:24 | 23:16 | 15:8 | 7:0 |
|---|---|---|---|---|---|
| 0 | M_WRITE | oid | ptag | pid | 0, T_REQ |
| 1 | 00 | 00 | 00 | 40 | K_LENGTH |
| 2 | 00 | 00 | FA | CE | K_WRITE_OFFSET |
| 3 | 76 | 54 | 32 | 10 | K_BYTES |
| 4 | FE | DC | BA | 98 | K_BYTES |

Other Message Encoding

According to an example embodiment, the class parameter may be an 8-bit enumerated type with the following encoding disclosed in Table 26, below. It should be understood, however, that the class parameter is not limited to 8 bits or the encoding of Table, 26, below.

TABLE 26

| Enum Member | Value(h) | Note |
|---|---|---|
| C_NULL | 00 | Exists to be extended only. Cannot declare an object of this type. |
| C_ADMIN | 01 | Exactly one pre-constructed instance per object-oriented memory device. |
| C_BYTES | 02 | Can be declared/constructed. Basic write and read methods. |
| C_FIFO | 03 | Adds push and pop. |
| (reserved) | — | Values reserved for future use. |

4.2.2 Numeric

Table 27, below, is an example embodiment of a listing of several properties and argument values are simply numeric in nature. It should be understood, however, that properties and argument values disclosed herein are not limited to same.

TABLE 27

| Property | Width | Note |
|---|---|---|
| num_objects | 8 | The maximum number of objects is implementation specific. It may be useful to start at 256 (8-bit) for a small implementation. |

TABLE 27-continued

| Property | Width | Note |
| --- | --- | --- |
| num_bytes, num_valid, *_offset | 16 | The maximum single-object buffer size is implementation specific. A multiple of 2 is recommended for simple mapping. The implementation may also specify a granularity (e.g., 4 KiB). |
| length | 6 | The maximum write/read access length is implementation specific. It may be useful to atomically handle at least 64 B together (6-bit). |
| is_empty, is_full | 1 | These are boolean. |

Interfaces

As disclosed above with regard to FIG. 2, a process block (i.e., hardware client) and the object-oriented memory device 210 may be coupled by two uni-directional streaming message buses, that is, the first SMBus 218a and second SMBus 218b. According to an example embodiment, such streaming message buses may function as simple point-to-point bit conductors with minimal end-of-message (EOM) delimiters. According to an example embodiment, the bus signals may be as disclosed in Table 28, below. It should be understood, however, that the bus signals are not limited thereto.

TABLE 28

| Signal | Width | Note |
| --- | --- | --- |
| valid | 1 | Advanced microcontroller bus architecture (AMBA) style buses. Indicates the bus is sending valid data/eom. |
| eom | 1 | End of Message. eom==1 only for the final cycle of a given message. |
| data | 40 | Multi-cycle conduit for message data. |

Ports and Protocol

According to an example embodiment, corresponding communications ports of the object-oriented memory device and hardware clients may be symmetric. Table 29, below, discloses example details regarding same. It should be understood, however, that details regarding such communications ports are not limited to those disclosed in Table 29, below.

TABLE 29

| Port | I/O | Type | Note |
| --- | --- | --- | --- |
| rst | in | 1-bit | Reset. Asynchronous assertion and synchronous de-assertion. |
| clk | in | 1-bit | Clock. Positive edge is active edge. |
| rx | in | SMBus | Receive bus for inbound messages. |
| tx | out | SMBus | Transmit bus for outbound messages. |

Figure 15A:
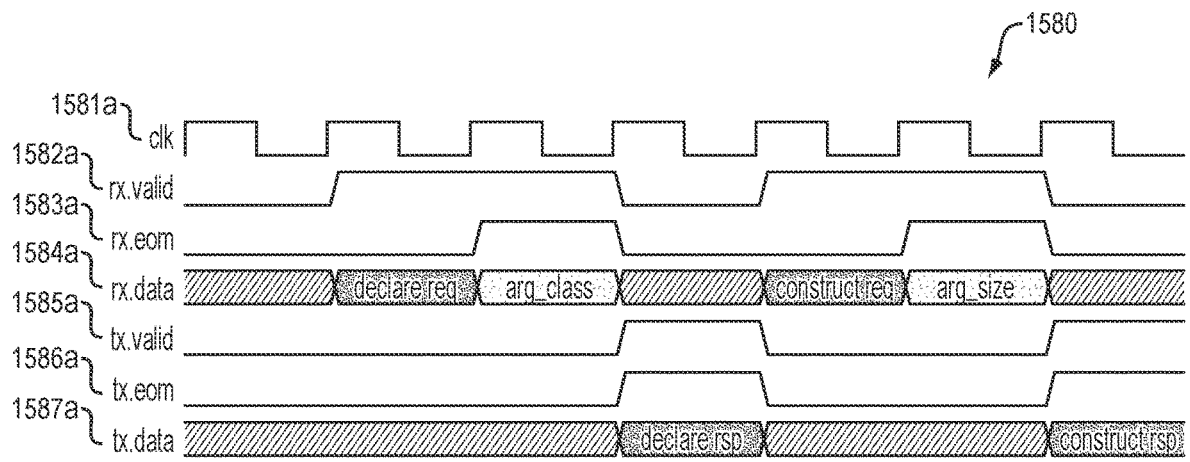
FIG. 15A is a signaling diagram of an example embodiment of signaling for declaration and construction of an object.

FIG. 15A is a signaling diagram 1580 of an example embodiment of signaling for declaration and construction of an object of the C_BYTES class, disclosed above. Such signaling may occur, for example, between the hardware client 108 and the object-oriented memory device 110 over the message bus 118 of FIG. 1B, disclosed above. The signaling diagram 1580 of FIG. 15A includes: a clock signal (i.e., clk 1581a), receive valid signal (i.e., rx.valid 1582a), receive end-of-message signal (i.e., rx.eom 1583a), receive data signal (i.e., rx.data 1584a), transmit valid signal (i.e., tx.valid 1585a), transmit end-of-message signal (i.e., tx.eom 1586a), and transmit data signal (i.e., tx.data 1587a).

In the example embodiment of FIG. 15A, the rx.valid 1582a, rx.eom 1583a, and rx.data 1584a signals are driven by a hardware client, such as the hardware client 108 of FIG. 1B, or any other hardware client disclosed herein. The rx.valid 1582a, rx.eom 1583a, and rx.data 1584a signals transition according to a rising or falling edge of the clk 1581a signal. The hardware client drives the rx.valid 1582a signal to indicate to an object-oriented memory device, such as the object-oriented memory device 110 of FIG. 1B, disclosed above, or any other object-oriented memory device disclosed herein, when data of an object-oriented message request, driven by the rx.data 1584a signal, is valid. The rx.eom 1583a is employed by the hardware client to provide an end-of-message indicator for the object-oriented message request.

The tx.valid 1585a, tx.eom 1586a, and tx.data 1587a signals are driven by the object-oriented memory device. The tx.valid 1585a, tx.eom 1586a, and tx.data 1587a signals transition according to a rising or falling edge of the clk 1581a signal. The object-oriented memory device drives the tx.valid 1585a signal to indicate to the hardware client when data of an object-oriented message response, driven by the tx.data 1587a signal, is valid. The tx.eom 1586a is employed by the object-oriented memory device to provide an end-of-message indicator for the object-oriented message response.

Figure 15B:
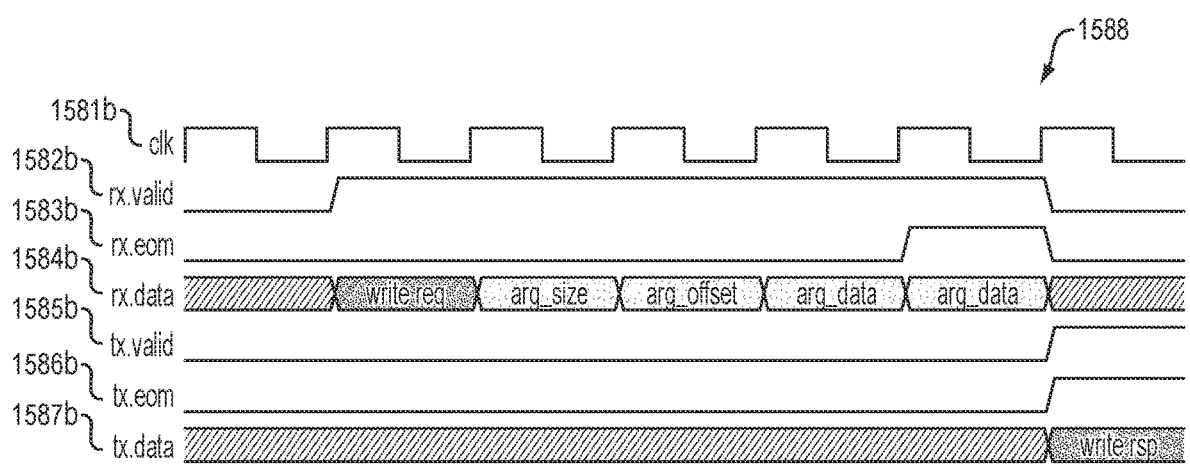
FIG. 15B is a signaling diagram of an example embodiment of signaling for calling a write method of the object.

FIG. 15B is a signaling diagram 1588 of an example embodiment of signaling for calling a write method of the object of the C_BYTES class to write a 64-bit item (e.g., C_BYTES .write( ). The signaling diagram 1588 of FIG. 15B includes: a clock signal (i.e., clk 1581b), receive valid signal (i.e., rx.valid 1582b), receive end-of-message signal (i.e., rx.eom 1583b), receive data signal (i.e., rx.data 1584b), transmit valid signal (i.e., tx.valid 1585b), transmit end-of-message signal (i.e., tx.eom 1586b), and transmit data signal (i.e., tx.data 1587b).

In the example embodiment of FIG. 15B, the rx.valid 1582b, rx.eom 1583b, and rx.data 1584b signals are driven by the hardware client. The rx.valid 1582b, rx.eom 1583b, and rx.data 1584b signals transition according to a rising or falling edge of the clk 1581b signal. The hardware client drives the rx.valid 1582b signal to indicate to the object-oriented memory device when data of an object-oriented message request, driven by the rx.data 1584b signal, is valid. The rx.eom 1583b is employed by the hardware client to provide an end-of-message indicator for the object-oriented message request.

The tx.valid 1585b, tx.eom 1586b, and tx.data 1587b signals are driven by the object-oriented memory device. The tx.valid 1585b, tx.eom 1586b, and tx.data 1587b signals transition according to a rising or falling edge of the clk 1581b signal. The object-oriented memory device drives the tx.valid 1585b signal to indicate to the hardware client when data of an object-oriented message response, driven by the tx.data 1587b signal, is valid. The tx.eom 1586b is employed by the object-oriented memory device to provide an end-of-message indicator for the object-oriented message response.

Figure 15C:
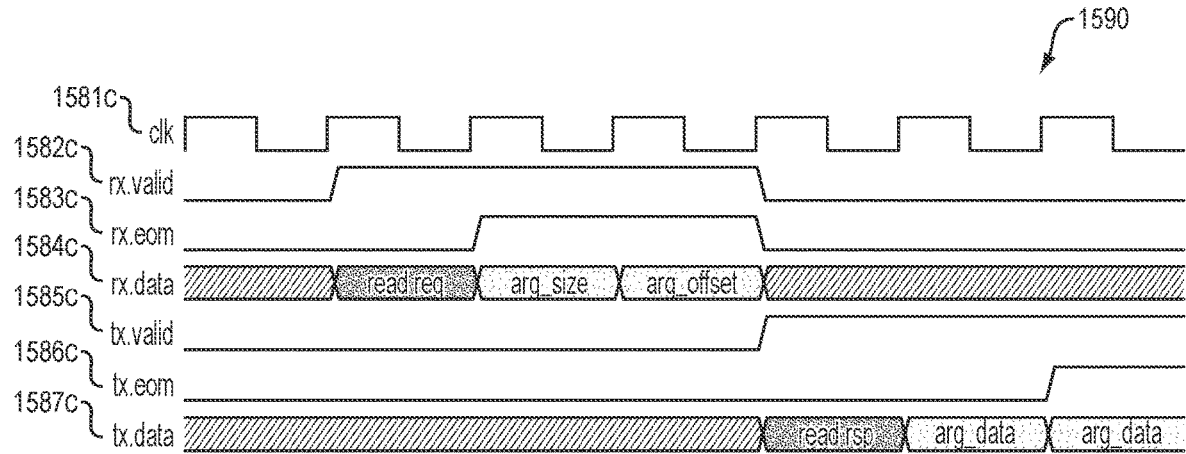
FIG. 15C is a signaling diagram of an example embodiment of signaling for calling a read method of the object.

FIG. 15C is a signaling diagram 1590 of an example embodiment of signaling for calling a read method of the object of the C_BYTES class to read the 64-bit item (e.g., C_BYTES .read( ) that was written. The signaling diagram 1590 of FIG. 15C includes: a clock signal (i.e., clk 1581c), receive valid signal (i.e., rx.valid 1582c), receive end-of-message signal (i.e., rx.eom 1583c), receive data signal (i.e., rx.data 1584c), transmit valid signal (i.e., tx.valid 1585c), transmit end-of-message signal (i.e., tx.eom 1586c), and transmit data signal (i.e., tx.data 1587c).

In the example embodiment of FIG. 15C, the rx.valid 1582c, rx.eom 1583c, and rx.data 1584c signals are driven by the hardware client. The rx.valid 1582c, rx.eom 1583c, and rx.data 1584c signals transition according to a rising or falling edge of the clk 1581c signal. The hardware client drives the rx.valid 1582c signal to indicate to the object-oriented memory device when data of an object-oriented message request, driven by the rx.data 1584c signal, is valid. The rx.eom 1583c is employed by the hardware client to provide an end-of-message indicator for the object-oriented message request.

The tx.valid 1585c, tx.eom 1586c, and tx.data 1587c signals are driven by the object-oriented memory device. The tx.valid 1585c, tx.eom 1586c, and tx.data 1587c signals transition according to a rising or falling edge of the clk 1581c signal. The object-oriented memory device drives the tx.valid 1585c signal to indicate to the hardware client when data of an object-oriented message response, driven by the tx.data 1587c signal, is valid. The tx.eom 1586c is employed by the object-oriented memory device to provide an end-of-message indicator for the object-oriented message response.

It should be understood that FIGS. 15A-C, disclosed above, are examples of signaling that may transpire between a hardware client and an object-oriented memory device, such as the hardware client 108 and object-oriented memory device 110 of FIG. 1B, disclosed above. Communications between the hardware client and object-oriented memory device are not, however, limited thereto. Referring back to FIG. 1B, the object-oriented memory device 110 may be employed in a variety of use cases, such as for bi-directional messaging between hardware clients and other uses, disclosed above, and may be employed as a cache device, such as the cache device 1610 of FIG. 16, disclosed below.

Figure 16:
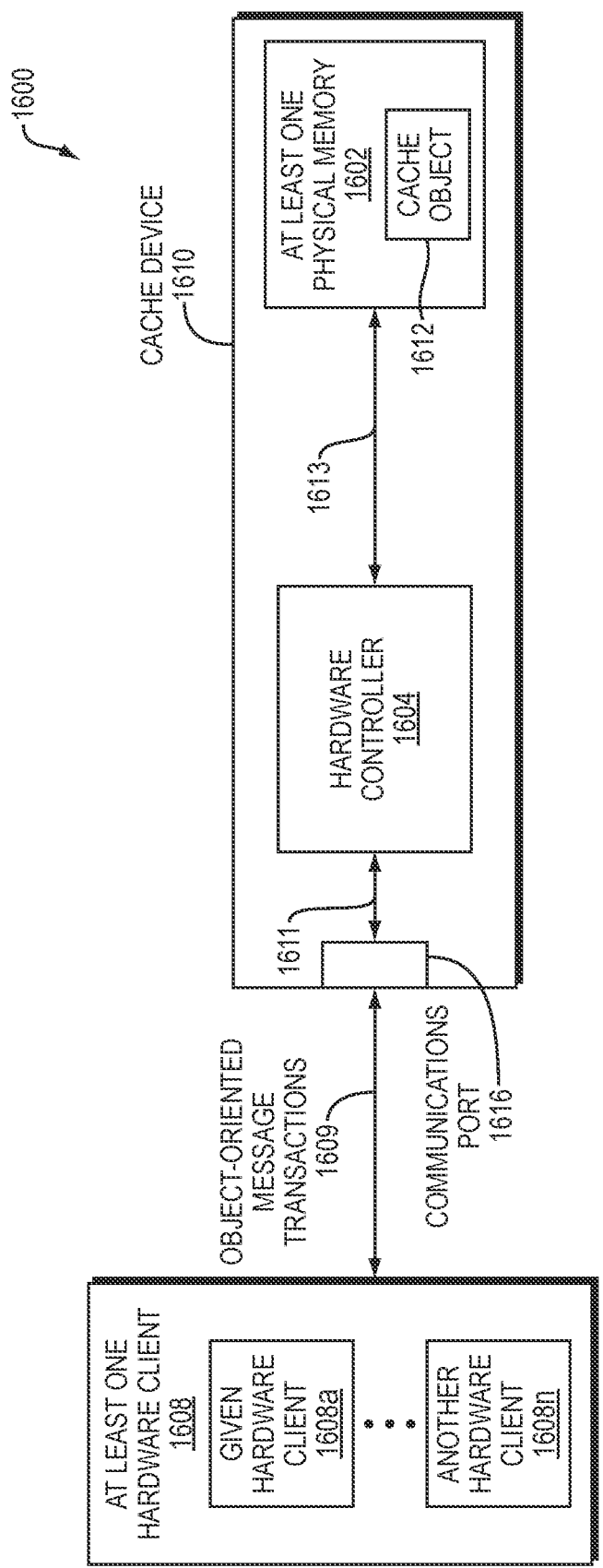
FIG. 16 is a block diagram of an example embodiment of a system in which an object-oriented memory device is employed as a cache device.

FIG. 16 is a block diagram of an example embodiment of a system 1600 in which an object-oriented memory device is employed as a cache device 1610. The cache device 1610 comprises at least one physical memory 1602 and a hardware controller 1604. The hardware controller 1604 is coupled intra the cache device 1610 to the at least one physical memory 1602 and configured to communicate with at least one hardware client 1608 based on object-oriented message transactions 1609 associated with a cache object 1612 instantiated in the at least one physical memory 1602. The hardware controller 1604 may be further configured to notify a given hardware client 1608a of the at least one hardware client 1608 in an event the given hardware client 1608a has subscribed to the cache object 1612 and the cache object 1612 has been invalidated by another hardware client 1608n of the at least one hardware client 1608.

In the example embodiment of FIG. 16, the hardware controller 1604 is coupled to the communications port 1616 via a first internal bus 1611 and is coupled to the at least one physical memory 1602 via a second internal bus 1613. The first internal bus 1611 enables the hardware controller 1604 to communicate with at least one hardware client 1608 based on object-oriented message transactions 1609 via the communications port 1616. The second internal bus 1613 is employed by the hardware controller 1604 to perform a write operation (not shown) to store data (not shown) that is specified by the write operation at an address (not shown) specified by the write operation. The second internal bus 1613 is further employed by the hardware controller 1604 to perform a read operation (not shown) to read data (not shown) that is stored at an address (not shown) of the at least one physical memory 1602. It should be understood that the communications port 1616 may be a single shared communications port or may be a plurality of communications ports that may each be dedicated to a particular hardware client or that may include a subset of shared communications ports.

In addition to being employed as the cache device 1610 of FIG. 16, disclosed above, an object-oriented memory device disclosed herein may be employed as a distributed cache, such as the distributed cache 1710 of FIG. 17, disclosed below.

Figure 17:
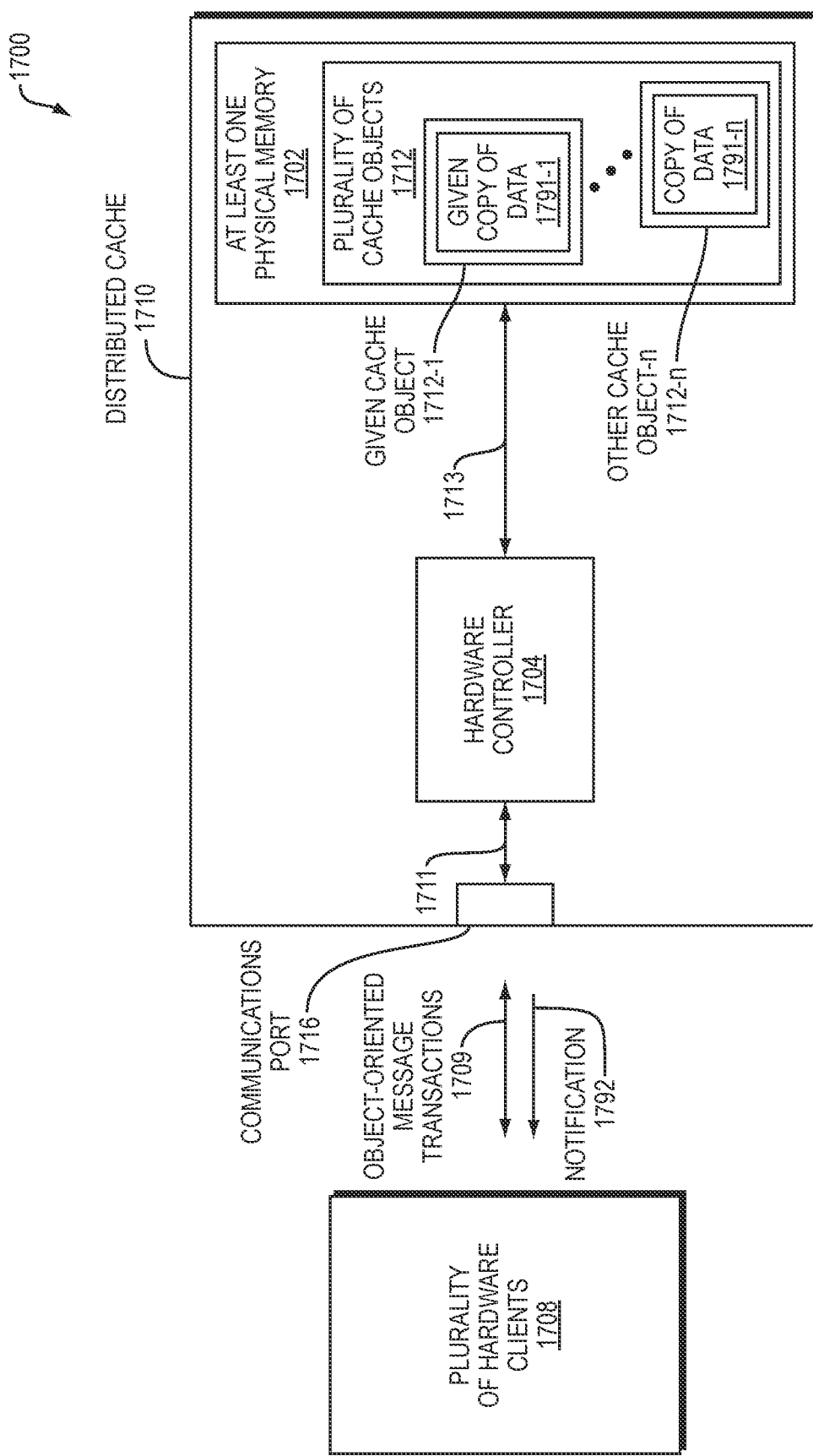
FIG. 17 is a block diagram of an example embodiment of a system in which an object-oriented memory device is employed as a distributed cache.

FIG. 17 is a block diagram of an example embodiment of a system 1700 in which an object-oriented memory device is employed as a distributed cache 1710. The distributed cache 1710 comprises at least one physical memory 1702 and a hardware controller 1704. The hardware controller 1704 is coupled intra the distributed cache 1710 to the at least one physical memory 1702 and configured to communicate with a plurality of hardware clients 1708 based on object-oriented message transactions 1709 associated with a plurality of cache objects 1712 instantiated in the at least one physical memory 1702. The hardware controller 1704 is further configured to update a copy of data 1791-n in the plurality of cache objects 1712 to replicate a change made to a given copy of the data 1791-1 in a given cache object 1712-1 of the plurality of cache objects 1712 and to broadcast a notification 1792 of the change to each hardware client of the plurality of hardware clients 1708 that is subscribed to a respective cache object of the plurality of cache objects 1712.

In the example embodiment of FIG. 17, the hardware controller 1704 is coupled to the communications port 1716 via a first internal bus 1711 and is coupled to the at least one physical memory 1702 via a second internal bus 1713. The first internal bus 1711 enables the hardware controller 1704 to communicate with the plurality of hardware clients 1708 based on object-oriented message transactions 1709 via the communications port 1716. The second internal bus 1713 is employed by the hardware controller 1704 to perform a write operation (not shown) to store data (not shown) that is specified by the write operation at an address (not shown) specified by the write operation. The second internal bus 1713 is further employed by the hardware controller 1704 to perform a read operation (not shown) to read data (not shown) that is stored at an address (not shown) of the at least one physical memory 1702. It should be understood that the communications port 1716 may be a single shared communications port or may be a plurality of communications ports that may each be dedicated to a particular hardware client or that may include subset of shared communications ports.

According to an example embodiment the hardware controller 1704 may include an object-oriented message encoder or decoder (codec) (not shown) that may be employed by the hardware controller 1704 to encode or decode object-oriented messages communicated as part of the object-oriented message transactions 1709. Such a codec may be included in a hardware controller of an object-oriented memory device disclosed herein, such as the object-oriented memory device 1810 of FIG. 18, disclosed below, or another object-oriented memory device disclosed herein.

Figure 18:
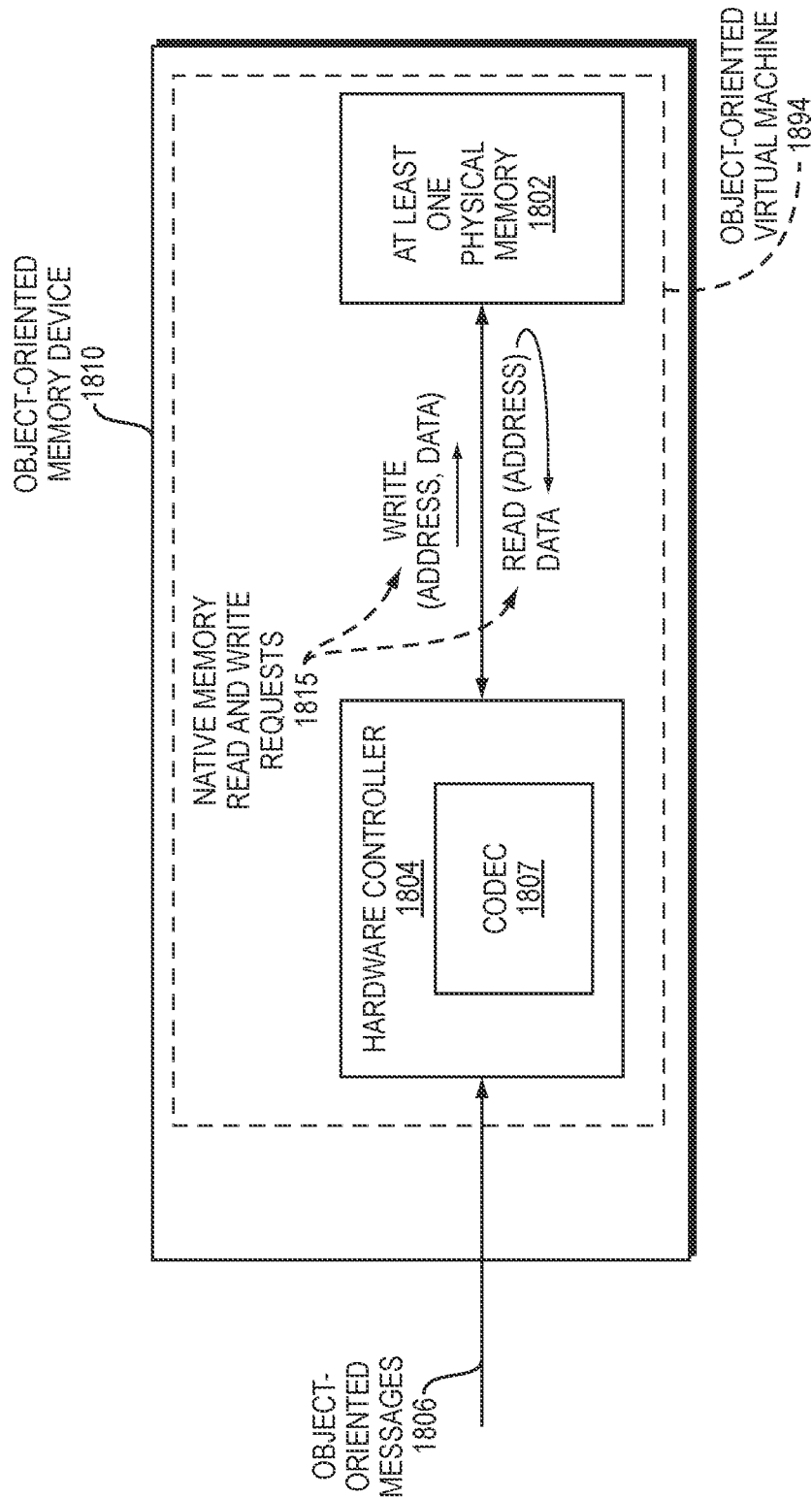
FIG. 18 is a block diagram of another example embodiment of an object-oriented memory device.

FIG. 18 is a block diagram of another example embodiment of an object-oriented memory device 1810. The object-oriented memory device 1810 includes at least one physical memory 1802 and a hardware controller 1804 configured to preprocess the at least one physical memory 1802 to create an object-oriented virtual machine 1894 that handles object-oriented messages 1806 as native memory read and write requests to the at least one physical memory 1802. The hardware controller 1804 includes a codec 1807. The codec 1807 is configured to intercept at least one memory read or write request, encoded as an object-oriented message of the object-oriented messages 1806, and decode the object-oriented message into a respective native memory read or write request to be implemented by the virtual machine 1894 created.

The hardware controller 1804 may be further configured to preprocess the at least one physical memory 1802 by initializing the at least one physical memory 1802 with an object-oriented library (not shown) that causes the preprocessed at least one physical memory 1802 to interpret the object-oriented messages 1806 as native memory read and write requests, such that the preprocessed at least one physical memory 1802 handles the object-oriented messages 1806 as native block memory instructions, that is, native memory read or write instructions. Preprocessing the at least one physical memory 1802 may include auto-instantiating an administrative (i.e., admin) object (not shown), such as the admin object disclosed above. The object-oriented library may include pre-compiled instructions to be executed by the hardware controller 1804. Such pre-compiled instructions may be employed in objects instantiated in the at least one physical memory 1802, such as the object 1912 instantiated in the at least one physical memory 1902 of FIG. 19, disclosed below.

Figure 19:
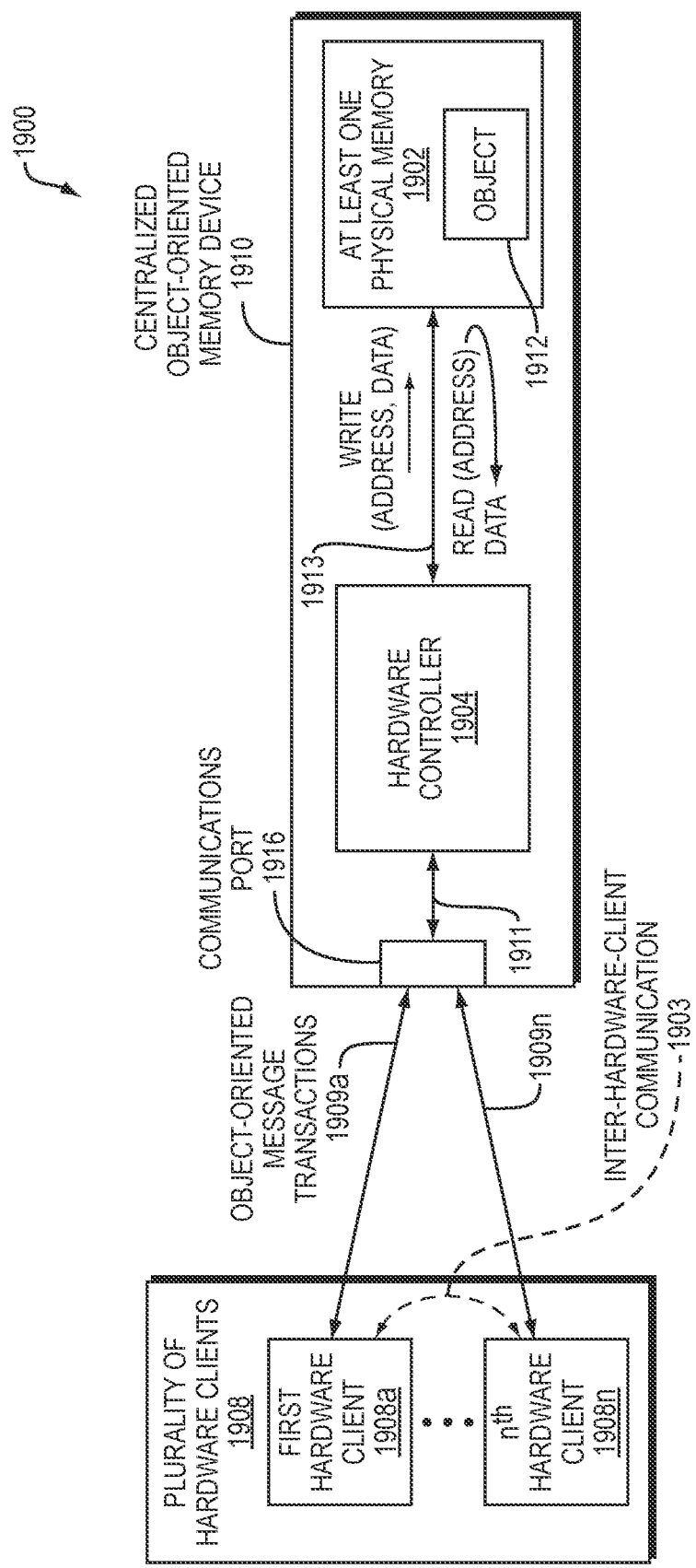
FIG. 19 is a block diagram of an example embodiment of a system comprising a centralized object-oriented memory device and a plurality of hardware clients.

FIG. 19 is a block diagram of an example embodiment of a system 1900 comprising a centralized object-oriented memory device 1910 and a plurality of hardware clients 1908. The centralized object-oriented memory device 1910 may be understood to be "centralized" as it is an object-oriented memory device that is central to the plurality of hardware clients 1908 as each hardware client of the plurality of hardware clients 1908 is coupled thereto via a respective messaging interface (not shown), such as the message bus 118 of FIG. 1B, disclosed above. The centralized object-oriented memory device 1910 may control inter-hardware-client communication 1903 among the plurality of hardware clients 1908 via at least one object instantiated therein, such as the object 1912.

In the example embodiment of FIG. 19, the plurality of hardware clients 1908 are configured to communicate, directly, with the centralized object-oriented memory device 1910 via object-oriented message transactions 1909*a* . . . 1909*n*. The centralized object-oriented memory device 1910 effects the inter-hardware-client communication 1903 among the plurality of hardware clients 1908 based on the object-oriented message transactions 1909*a* . . . 1909*n*.

The centralized object-oriented memory device 1910 includes at least one physical memory 1902. A plurality of objects (not shown) may be instantiated in the at least one physical memory 1902. Each object of the plurality of objects may be defined by a respective object class. Each object may include at least one respective data member and at least one respective method, as defined by the respective object class, as disclosed above with regard to FIG. 4.

The at least one physical memory 1902 may have at least one object instantiated therein, such as the object 1912. The at least one object is associated with a respective object class and includes at least one respective data member and at least one respective method, as defined by the respective object class, such as disclosed above with regard to FIG. 4. The centralized object-oriented memory device 1910 may be configured to employ the at least one object to effect the inter-hardware-client communication 1903.

A pair of first-in first-out (FIFO) objects (not shown) may be instantiated in the at least one physical memory 1902, such as disclosed above with regard to FIG. 11. The centralized object-oriented memory device 1910 may be configured to employ the pair of FIFO objects to effect the inter-hardware-client communication 1903. It should be understood, however, that the centralized object-oriented memory device 1910 may employ other object(s) to effect such inter-hardware-client communication 1903 and is not limited to employing a pair of FIFO objects to effect same.

The centralized object-oriented memory device 1910 includes a hardware controller 1904. The hardware controller 1904 may be configured to enable bi-directional communication between the first hardware client 1908*a* and a second hardware client of the plurality of hardware clients, such as the nth hardware client 1908*n*, by managing the pair of FIFO objects intra the centralized object-oriented memory device 1910. The centralized object-oriented memory device 1910 further includes a communications port 1916. The hardware controller 1904 is coupled to the communications port 1916 via a first internal bus 1911 and is coupled to the at least one physical memory 1902 via a second internal bus 1913.

The object-oriented message transactions 1909*a* . . . 1909*n* may include an unsolicited message (not shown) associated with handles (not shown) of the pair of FIFO objects. The hardware controller 1904 may be further configured to generate the unsolicited message and to broadcast the unsolicited message generated to the first and second hardware clients. The unsolicited message may indicate that the pair of FIFOs are available for the bi-directional communication.

The centralized object-oriented memory device 1910 may be configured to employ a first FIFO object (not shown) of the pair of FIFO objects to effect communication from the first hardware client 1908*a* of the plurality of hardware clients 1908 to a second hardware client, such as the nth hardware client 1908*n*, of the plurality of hardware clients 1908. The centralized object-oriented memory device 1910 may be further configured to employ a second FIFO object (not shown) of the pair of FIFO objects to effect communication from the second hardware client to the first hardware client 1908*a*.

The object-oriented message transactions 1909*a* . . . 1909*n* may include a first object-oriented message (not shown) transmitted by the first hardware client 1908*a* to the centralized object-oriented memory device 1910 and a second object-oriented message (not shown) transmitted by the centralized object-oriented memory device 1910 to the second hardware client.

The hardware controller 1904 may be configured to decode the first object-oriented message and execute a push method (not shown) of the first FIFO object to push data (not shown) received from the first hardware client 1908*a*. The data may be included in the first object-oriented message. The first FIFO object and push method may be identified in the first object-oriented message. The hardware controller 1904 may be further configured to generate an interrupt (not shown) to the second hardware client by transmitting the second object-oriented message to the second hardware client. The interrupt may notify the second hardware client of an inter-hardware-client message (not shown) from the first hardware client 1908*a*. The data may represent the inter-hardware-client message.

The object-oriented message transactions 1909*a* . . . 1909*n* may include a third object-oriented message (not shown) transmitted by the second hardware client to the centralized object-oriented memory device 1910 in response to servicing the interrupt, transmitted as the second object-oriented message. The object-oriented message transactions 1909a . . . 1909n may include a fourth object-oriented message (not shown). The third object-oriented message may be a request to call a pop method (not shown) and may include a handle (not shown) to the first FIFO object. The hardware controller 1904 may be further configured to execute the pop method of the first FIFO object and transmit the data, returned by the pop method executed, to the second hardware client via the fourth object-oriented message, thereby passing the inter-hardware-client message from the first hardware client to the second hardware client.

The hardware controller 1904 may be configured to decode the second object-oriented message and execute a push method (not shown) of the second FIFO object to push data received from the second hardware client. The data may be included in the second object-oriented message. The second FIFO object and push method may be identified in the second object-oriented message. The hardware controller 1904 may be further configured to generate an interrupt (not shown) to the first hardware client 1908a by transmitting the first object-oriented message to the first hardware client. The interrupt may notify the first hardware client 1908a of an inter-hardware-client message from the second hardware client. The data may represent the inter-hardware-client message. The third object-oriented message may be transmitted by the first hardware client 1908a to the centralized object-oriented memory device 1910 in response to servicing the interrupt, transmitted as the first object-oriented message.

The third object-oriented message may be a request to call a pop method (not shown) and may include a handle (not shown) to the second FIFO object. The hardware controller 1904 may be further configured to execute the pop method of the second FIFO object and transmit the data, returned by the pop method executed, to the first hardware client 1908a via the fourth object-oriented message, thereby passing the inter-hardware-client message from the second hardware client to the first hardware client.

As such, an object-oriented memory device, such as the centralized object-oriented memory device 1910 of FIG. 19, disclosed above, or other object-oriented memory device disclosed herein may be employed to "solve" inter-process communication for attached process blocks, such as any of the hardware clients disclosed herein. However, it may not be physically practical for all process blocks that communicate to be attached to a single centralized object-oriented memory device. As such, a distributed arrangement of a plurality of object-oriented memory devices may be employed.

With such an arrangement, hardware clients may "think" they are directly attached but are physically attached to local object-oriented memory device nodes/zones. According to an example embodiment, an object-oriented memory device may employ a method to determine whether an object-oriented memory device is local or remote. Such an indication may be represented as a zone indication embedded in a process or object identifier. Local object-oriented memory device nodes/zones may be configured to handle underlying network needs of a plurality of object-oriented memory devices. As such, an example embodiment of an object-oriented memory device disclosed herein may include a "back-end" interface that includes a given communications port configured to communicate with at least one other object-oriented memory device for inter-node communication, that is, communication between multiple object-oriented memory devices, referred to herein as inter-object-oriented-memory-device communication, such as the inter-object-oriented-memory-device communication 2052 of FIG. 20, disclosed further below.

Figure 20:
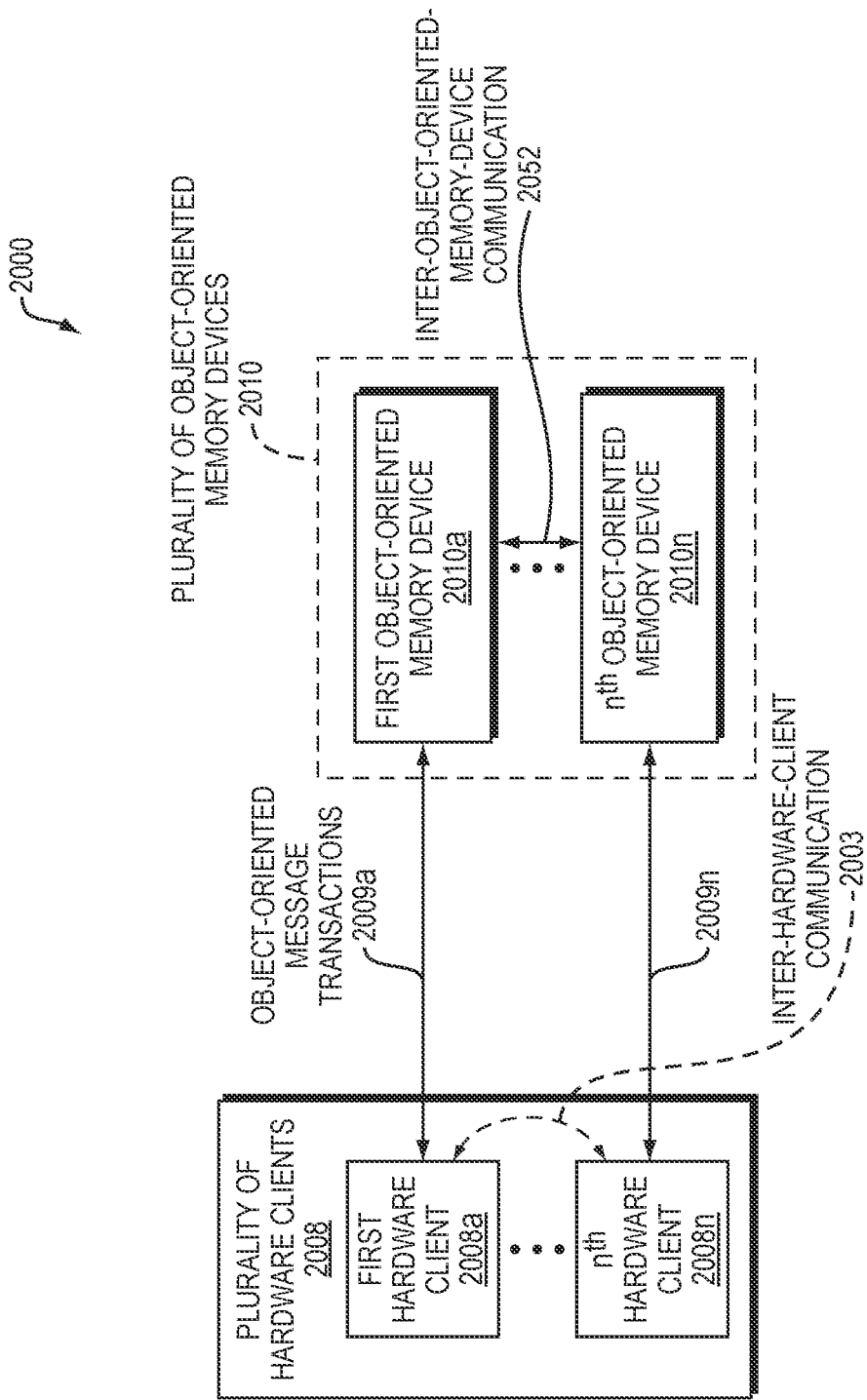
FIG. 20 is a block diagram of an example embodiment of a system that comprises a plurality of object-oriented memory devices and a plurality of hardware clients.

FIG. 20 is a block diagram of an example embodiment of a system 2000 that comprises a plurality of object-oriented memory devices 2010 and a plurality of hardware clients 2008. The plurality of object-oriented memory devices 2010 are capable of inter-object-oriented-memory-device communication 2052. In the example embodiment of FIG. 20, each hardware client of the plurality of hardware clients 2008 is configured to communicate, directly, to a respective object-oriented memory device of the plurality of object-oriented memory devices 2010 via object-oriented message transactions.

For example, a first hardware client 2008a and an nth hardware client 2008n of the plurality of object-oriented memory devices 2010 are configured to communicate, directly, with the first object-oriented memory device 2010a and the nth object-oriented memory device 2010n of the plurality of object-oriented memory devices 2010, respectively. The inter-object-oriented-memory-device communication 2052 effects inter-hardware-client communication 2003 among the plurality of hardware clients 2008 based on the object-oriented message transactions 2009a and 2009n. An example embodiment of such a hardware client is disclosed below, with regard to FIG. 21.

Figure 21:
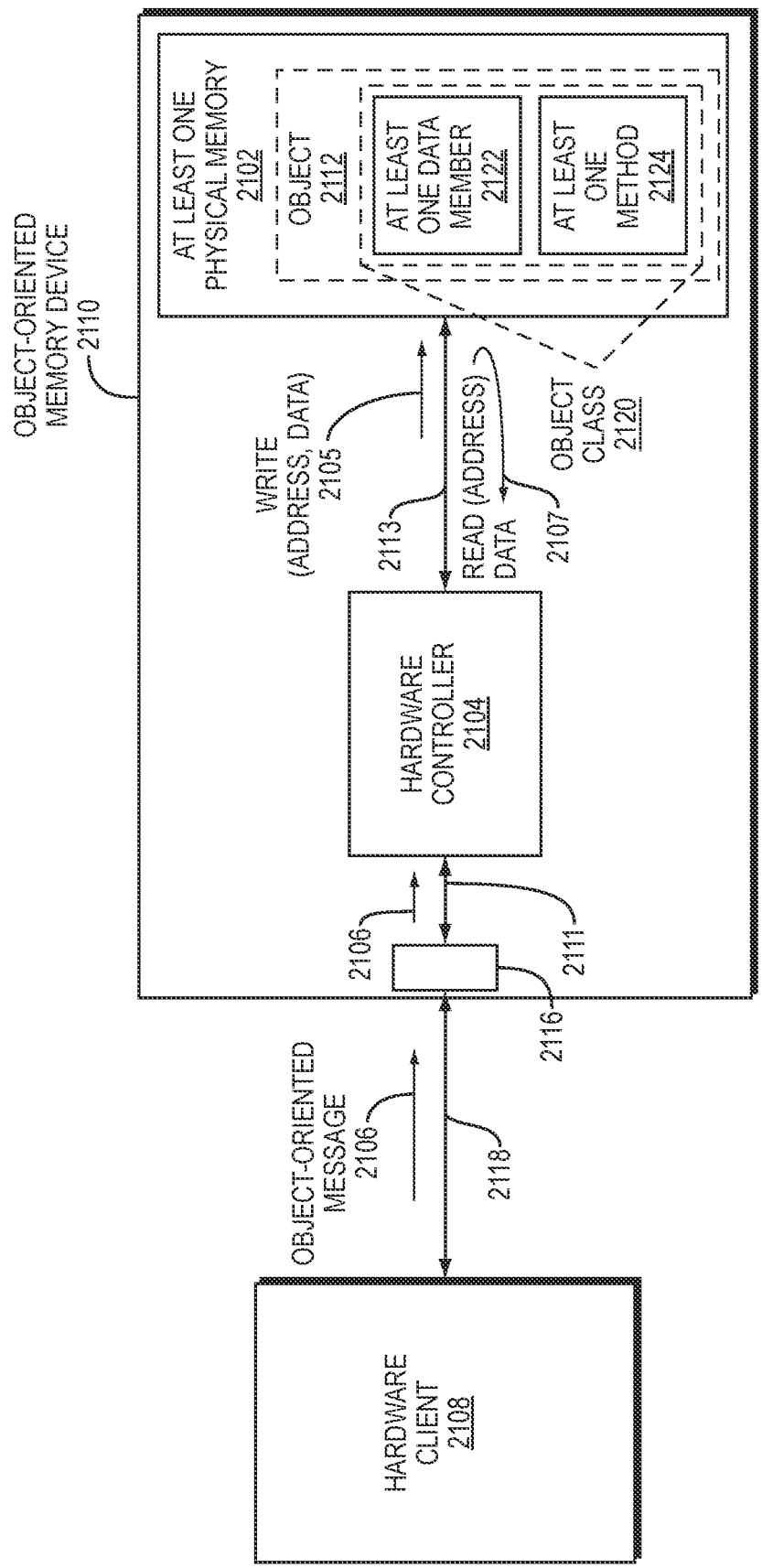
FIG. 21 is a block diagram of an example embodiment of a hardware client of an object-oriented memory device.

FIG. 21 is a block diagram of an example embodiment of a hardware client 2108 of an object-oriented memory device 2110. In the example embodiment of FIG. 21, the object-oriented memory device 2110 comprises a communications port 2116. The hardware client 2108 is coupled to the object-oriented memory device 2110 via a message bus 2118, also referred to herein as a hardware communications interface, over which object-oriented messages, such as the object-oriented message 2106 is communicated. The message bus 2118 is coupled to a communications port 2116 of the object-oriented memory device 2110.

The object-oriented memory device 2110 includes a hardware controller 2104 that is coupled to the communications port 2116 via a first internal bus 2111 and is coupled to at least one physical memory 2102 via a second internal bus 2113.

The first internal bus 2111 enables the hardware controller 2104 to receive the object-oriented message 2106 and transmit, optionally, a response (not shown) via the communications port 2116. The second internal bus 2113 is employed by the hardware controller 2104 to perform a write operation 2105 to store data (not shown) that is specified by the write operation 2105 at an address (not shown) specified as part of the write operation 2105. The second internal bus 2113 is further employed by the hardware controller 2104 to perform a read operation 2107 to read data (not shown) that is stored at an address (not shown) of the at least one physical memory 2102. The address is specified as part of the read operation 2107.

In the example embodiment of FIG. 21, the hardware client 2108 is configured to generate the object-oriented message 2106 that is associated with an object 2112 of an object class 2120. The hardware client 2108 may include an encoder (not shown) for generation of same and may include a decoder (not shown) for decoding object-oriented messages received from the object-oriented memory device 2110.

As disclosed above, the object-oriented message 2106 is associated with the object 2112 of the object class 2120. The object class 2120 includes at least one data member 2122 and at least one method 2124. The hardware client 2108 is further configured to transmit the object-oriented message 2106 generated to the object-oriented memory device 2110 via the hardware communications interface, that is, the message bus 2118 coupling the hardware client 2108 to the object-oriented memory device 2110. The object 2112 is instantiated or to-be instantiated in at least one physical memory 2102 of the object-oriented memory device 2110 according to the object class 2120. The at least one method 2124 enables the object-oriented memory device 2110 to access the at least one data member 2122 for the hardware client 2108.

The object-oriented message 2106 may include a message type, process identifier, process tag, object identifier, method identifier, argument list, or a combination thereof, such as disclosed above with regard to FIG. 14. The hardware client 2108 may be central processing unit (CPU), Peripheral Component Interconnect Express (PCIe) device, Ethernet device, accelerator device, or digital signal processing (DSP) device, such as disclosed above with regard to FIG. 2. The hardware communications interface, that is, the message bus 2118, may include two uni-directional streaming message bus (SMBus) buses, such as disclosed above with regard to FIG. 2.

According to an example embodiment, the object class 2120 may be a buffer object class, queue object class, stack object class, or broadcast object class, disclosed above. It should be understood, however, that the object class 2120 is not limited thereto. The at least one method 2124 may include an allocation method, de-allocation method, size method, write method, read method, push method, pop method, modify-in-place method, copy method, cyclic redundancy check (CRC) generation method, CRC check method, error-correcting code (ECC) method, randomization method, or a combination thereof. It should be understood, however, that the at least one method 2124 is not limited thereto.

The object 2112 may be a new object to-be-instantiated in the at least one physical memory 2102. The object-oriented message 2106 may be a request to declare the new object. The request may include the object class 2120 for the new object. The object class 2120 may define the new object.

The object-oriented message 2106 may be a request to call a given method of the at least one method 2124 and the request may include a handle (not shown) for the object 2112 and a method identifier (not shown) of a given method (not shown) of the at least one method 2124. The object-oriented message 2106 may include at least one argument (not shown). The object-oriented memory device 2110 may execute a given method of the at least one method 2124 employing the at least one argument included.

The hardware client 2108 may be a hardware process configured to interact with a stack (not shown) of an operating system (not shown). The object-oriented message 2106 may be sourced from the stack. The hardware process may be configured to employ data (not shown) stored in the at least one physical memory 2102. The object-oriented memory device 2110 may be configured to manage a structure of the data in the at least one physical memory 2102 for the hardware process via the object 2112. The object 2112 may be a private storage buffer employed by the hardware process, such as disclosed above. The at least one data member 2122 may be stored in the private storage buffer.

The object 2112 may be an error-correcting code (ECC) object. A payload (not shown) may be included in the object-oriented message 2106. The at least one data member 2122 may include an ECC corrected version of the payload. The object 2112 may be a first-in first-out (FIFO) object, such as disclosed above. The at least one data member 2122 may be a data element of the FIFO object. The object 2112 may be a stack object and the at least one data member 2122 may include nested thread context.

Figure 22:
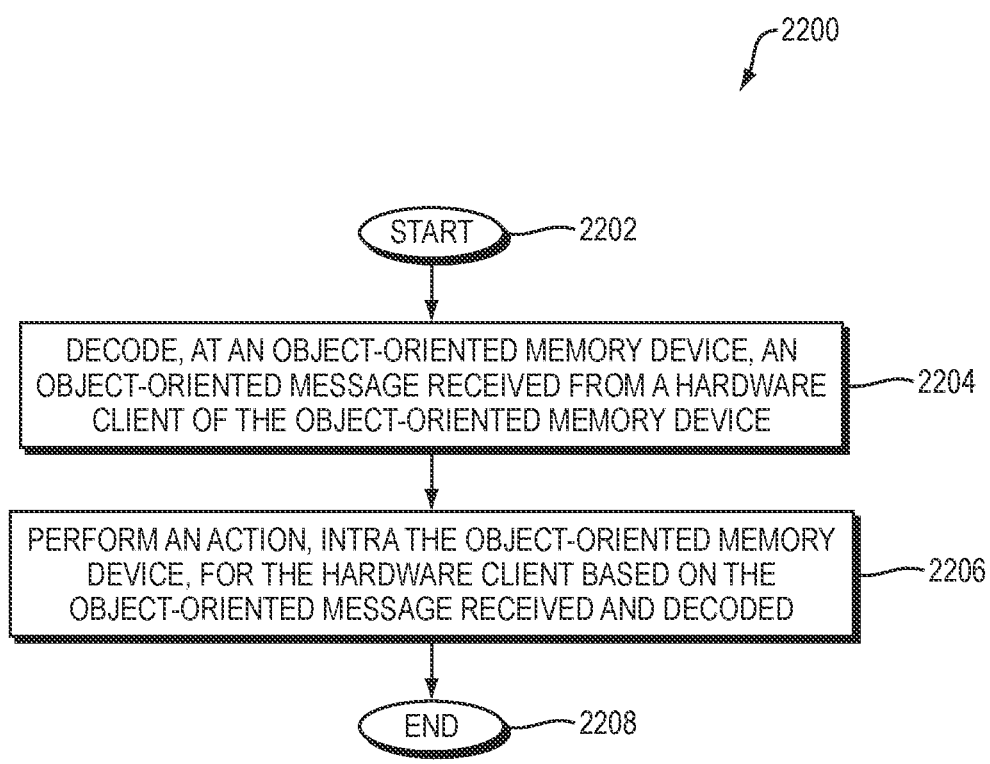
FIGS. 22-29 are flow diagrams of example embodiments of methods.

FIG. 22 is a flow diagram 2200 of an example embodiment of a method. The begins (2202) and decodes, at an object-oriented memory device, an object-oriented message received from a hardware client of the object-oriented memory device (2204). The method performs an action, intra the object-oriented memory device, the action performed for the hardware client based on the object-oriented message received and decoded (2206). The object-oriented message is associated with an object instantiated or to-be-instantiated in at least one physical memory of the object-oriented memory device. The action is associated with the object. The method thereafter ends (2208), in the example embodiment.

The method may further comprise encoding a response to the object-oriented message received and decoded and transmitting the response encoded to the hardware client, the response encoded based on the action performed.

The method may further comprise including at least one data member and at least one method in the object as defined by an object class, the object class defining the object.

The method may further comprise instantiating the object in the at least one physical memory based on the object class including the respective compiled code of the at least one method, or a respective pointer to the respective compiled code, in the object instantiated.

The object class may be a buffer object class, queue object class, stack object class, or broadcast object class. In an event the object class is the buffer object class, the method may further comprise including a buffer in the at least one data member and including a read method and write method in the at least one method for reading and writing the buffer, respectively.

In an event the object class is the queue object class, the method may further comprise including a first-in first-out (FIFO) data structure, read pointer, and write pointer in the at least one data member; including a push method and pop method in the at least one method for pushing data to the FIFO data structure and popping data from the FIFO data structure, respectively; and employing the write and read pointers in the push and pop methods, respectively.

In an event the object class is the stack object class, the method may further comprise including a first-in last-out (FILO) data structure, read pointer, and write pointer in the at least one data member; including a push method and pop method in the at least one method for pushing data to the FILO data structure and popping data from the FILO data structure, respectively; and employing the write and read pointers in the push and pop methods, respectively.

In an event the object class is the broadcast object class, the method may further comprise including at least one variable in the at least one data member; including a read method and write method in the at least one method for reading and writing, respectively, a given variable of the at least one variable; including a subscribe method in the at least one method for registering to receive a notification of a change in value of the given variable; and including an unsubscribe method in the at least one method for de-registering to receive the notification.

In an event the value of the given variable changes, the method may further comprise generating an object-oriented notification message associated with the object; and transmitting the object-oriented notification message generated to each hardware client of the object-oriented memory device that is subscribed to receive the notification.

The object may be a new object to-be-instantiated in the at least one physical memory and the object-oriented message may be a request to declare the new object. The request may include an object class for the new object. The object class defines the new object.

Performing the action may include allocating a unique handle value identifying the new object declared; encoding a response including the unique handle value allocated; and transmitting the response encoded to the hardware client.

The hardware client may be coupled to a given communications port of at least one communications port of the object-oriented memory device and the transmitting may include transmitting the response encoded via the given communications port.

The request may be received via a given communications port of at least one communications port of the object-oriented memory device and the encoding may include obtaining a unique hardware client identifier associated with the hardware client from the request or deriving the unique hardware client identifier based on the given communications port. The encoding may further include: including the unique hardware client identifier in the response encoded and transmitted.

The object-oriented message may be a request to call a given method included in the object and the method may further comprise including, in the request, a handle for the object and a method identifier of the given method.

Performing the action may include identifying the given method based on the handle and method identifier and executing, intra the object-oriented memory device, the given method identified. The method may further comprise including at least one argument in the object-oriented message and the executing may include employing the at least one argument included. The given method identified may be an allocation method. The at least one argument may include a buffer size and the executing may include instantiating the object in the at least one physical memory with an object buffer according to the buffer size included.

The object may be instantiated in the at least one physical memory and may include an object buffer. The given method identified may be a de-allocation method and the executing may include un-instantiating the object with the object buffer.

Performing the action may include encoding a response based on a result of the executing and transmitting the response encoded to the hardware client. The result may be an indication of whether the given method identified and executed completed successfully and the encoding may include: including the indication in the response encoded and transmitted. The result may include data returned by the given method identified and executed and the encoding may include: including the data in the response encoded and transmitted. The hardware client may be coupled to a given communications port of at least one communications port of the object-oriented memory device and the transmitting may include transmitting the response encoded to the hardware client via the given communications port. The encoding may include obtaining a unique hardware client identifier associated with the hardware client from the request or deriving the unique hardware client identifier based on the given communications port. The encoding may further include: including the hardware client identifier in the response encoded and transmitted. The executing may include employing a given processing circuit of at least one processing circuit of the object-oriented memory device to execute the given method identified.

The method may further comprise decoding the object-oriented message received based on a communications protocol defining a set of object-oriented message requests and responses and format thereof; generating a response based on the communications protocol; and transmitting the response generated to the hardware client.

The method may further comprise allocating and deallocating memory of the at least one physical memory via a memory manager located within the object-oriented memory device, the memory allocated or deallocated for objects associated with a respective object class, data member, and method.

The method may further comprise instantiating the object in the at least one physical memory via a memory manager located within the object-oriented memory device. The method may further comprise associating the object instantiated with a unique hardware client identifier of the hardware client. The object-oriented memory device may include a class library storing object class definitions the instantiating may include employing a given class of the class library to instantiate the object in the at least one physical memory, the given class defining the object.

The method may further comprise performing garbage collection by a memory manager located intra the object-oriented memory device to recycle physical space of the at least one physical memory in response to un-instantiation of objects intra the object-oriented memory device.

The at least one physical memory may be a shared resource used for storing objects associated with a plurality of hardware clients and the method may further comprise enforcing, intra the object-oriented memory device, data privacy and protection of the objects stored in the shared resource.

Data associated with the hardware client may be included in the object instantiated in the at least one physical memory and performing the action may include accessing the data for the hardware client via at least one method of an object class defining the object and transmitting a response to the hardware client, the response transmitted with the data accessed.

The method may further comprise interacting with a stack of an operating system and sourcing the object-oriented message from the stack.

The hardware client may be a hardware process configured to employ data stored in the at least one physical memory and the method may further comprise managing a structure of the data in the at least one physical memory for the hardware process via the object.

The hardware client may be a hardware process. The object may be a private storage buffer employed by the hardware process and performing the action may include accessing the private storage buffer for the hardware process.

The object may be an error-correcting code (ECC) object and performing the action may include employing the object to apply ECC correction on a payload for the hardware client, wherein the payload is included in the object-oriented message received.

The object may be a first-in first-out (FIFO) object and the method may further comprise managing a read and write pointer to the FIFO object, exclusively, intra the object-oriented memory device.

The method may further comprise determining an empty or full status for the FIFO object based on the read and write pointers and, in an event it is determined that the FIFO object is full, the method may further comprise notifying the hardware client via a notification message. Performing the action may include pushing data to the FIFO object and updating the write pointer, wherein the data pushed is included in the object-oriented message received. The method may further comprise notifying another hardware client in response to pushing the data for the hardware client. The method may further comprise notifying the hardware client in an event another object-oriented message is received from another hardware client and data is pushed to the FIFO object in response to same. Performing the action may include: popping data from the FIFO object; returning the data popped in a response message transmitted to the hardware client; and updating the read pointer.

The object may be a stack object and performing the action may include saving nested thread context to the stack object for the hardware client, the nested thread context included in the object-oriented message received.

The hardware client may be a first hardware process, the object may be a first FIFO object, the first FIFO object and a second FIFO object may be instantiated in the at least one physical memory, and the method may further comprise enabling bi-directional communication between the first hardware process and a second hardware process by managing the first and second FIFOs intra the object-oriented memory device. The method may further comprise generating an unsolicited message and broadcasting the unsolicited message generated to the first and second hardware processes, the unsolicited message indicating that the first and second FIFOs are available for bi-directional communication between the first and second hardware processes.

The object-oriented message received may include a message type, process identifier, process tag, object identifier, method identifier, argument list, or a combination thereof. The object may include at least one other object. The method may further comprise associating the object with metadata, the metadata including respective hardware client identifiers of hardware clients subscribed to the object.

Figure 23:
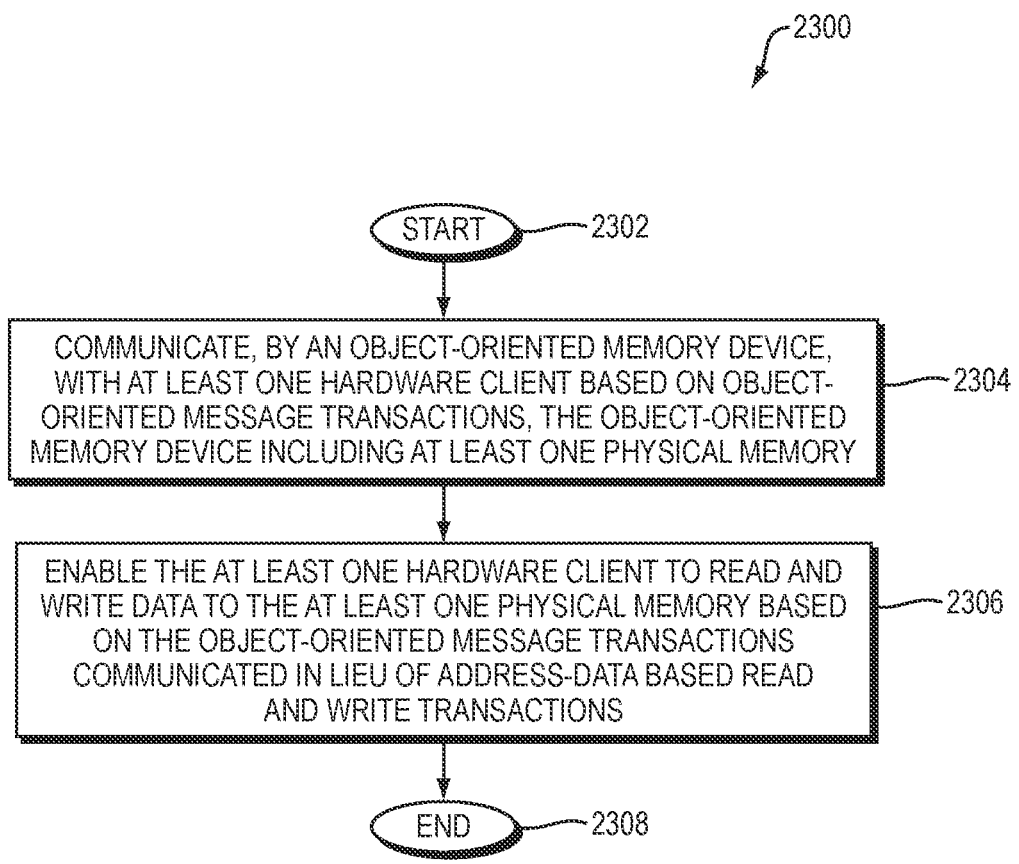

FIG. 23 is a flow diagram 2300 of an example embodiment of a method. The method begins (2302) and communicates, by an object-oriented memory device, with at least one hardware client based on object-oriented message transactions (2304). The object-oriented memory device includes at least one physical memory. The method enables the at least one hardware client to read and write data to the at least one physical memory based on object-oriented message transactions in lieu of address-data based memory read and write transactions (2306), and the method thereafter ends (2308) in the example embodiment.

Figure 24:
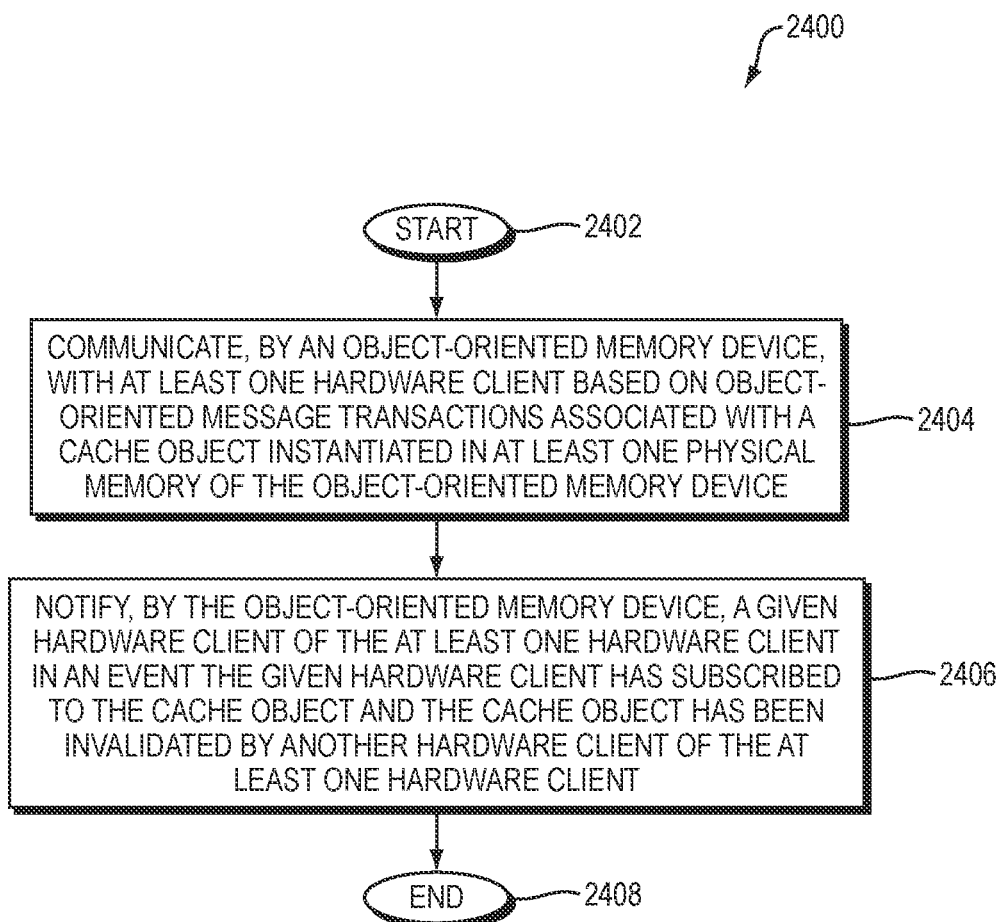

FIG. 24 is a flow diagram 2400 of an example embodiment of a method. The method begins (2402) and communicates, by an object-oriented memory device, with at least one hardware client based on object-oriented message transactions associated with a cache object instantiated in at least one physical memory of the object-oriented memory device (2404). The method notifies, by the object-oriented memory device, a given hardware client of the at least one hardware client in an event the given hardware client has subscribed to the cache object and the cache object has been invalidated by another hardware client of the at least one hardware client (2406). The notifying includes transmitting an object-oriented message associated with the cache object. The method thereafter ends (2408), in the example embodiment.

Figure 25:
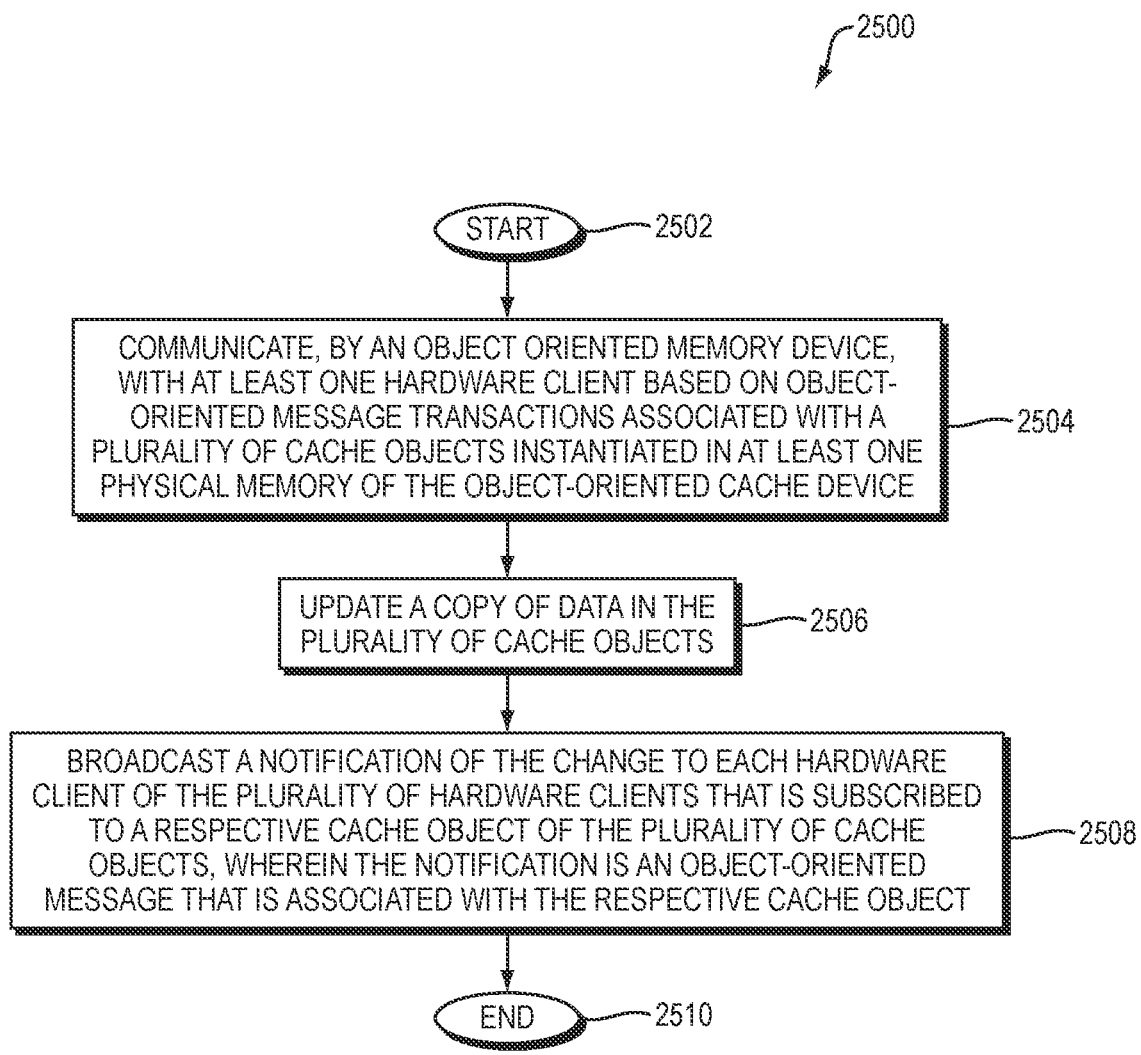

FIG. 25 is a flow diagram 2500 of an example embodiment of a method. The method begins (2502) and communicates, by an object-oriented memory device, with at least one hardware client based on object-oriented message transactions associated with a plurality of cache objects instantiated in at least one physical memory of the object-oriented cache device (2504). The method updates a copy of data in the plurality of cache objects, the updating including replicating a change made to a given copy of the data in a given cache object of the plurality of cache objects (2506). The method broadcasts a notification of the change to each hardware client of the plurality of hardware clients that is subscribed to a respective cache object of the plurality of cache objects, wherein the notification is an object-oriented message that is associated with the respective cache object (2508), and the method thereafter ends (2510) in the example embodiment.

Figure 26:
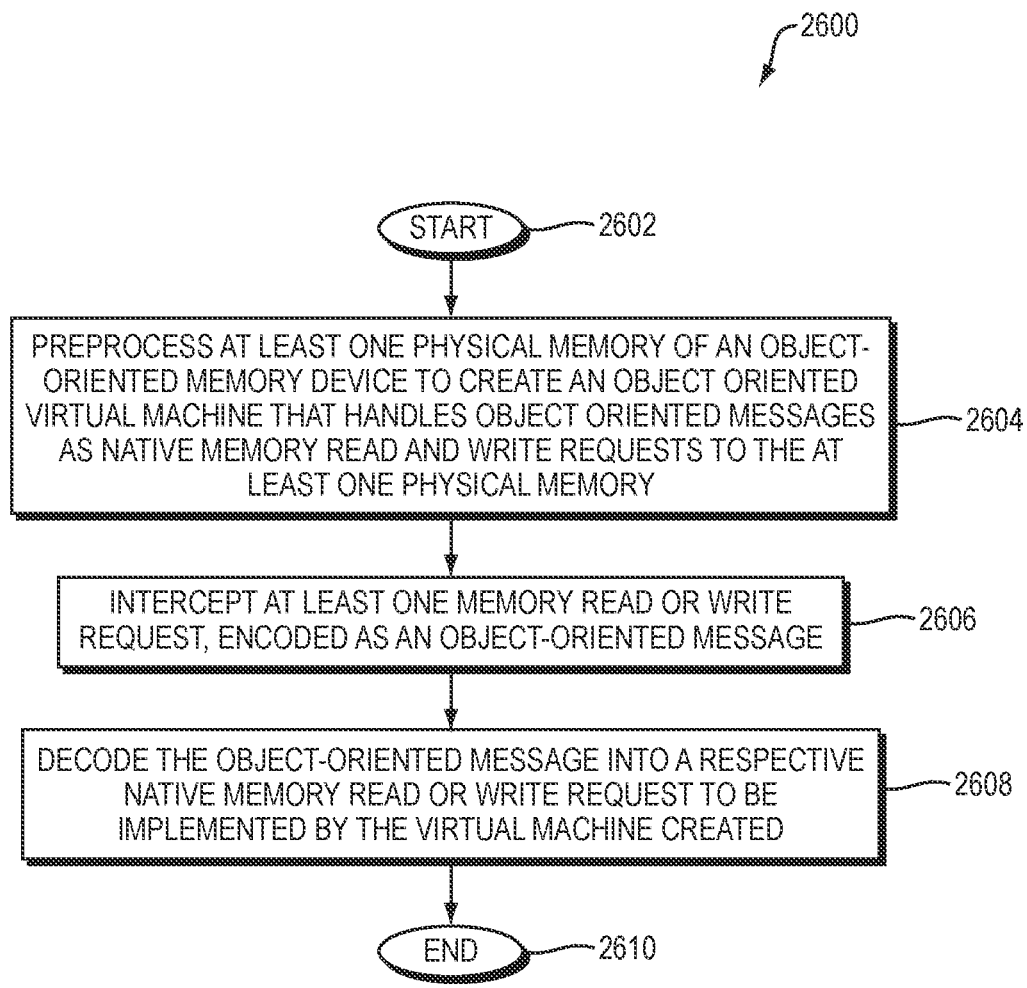

FIG. 26 is a flow diagram 2600 of an example embodiment of a method. The method begins (2602) and preprocesses at least one physical memory of an object-oriented memory device to create an object-oriented virtual machine that handles object-oriented messages as native memory read and write requests to the at least one physical memory (2604). The method intercepts at least one memory read or write request, encoded as an object-oriented message (2606), and decodes the object-oriented message into a respective native memory read or write request to be implemented by the virtual machine created (2608). The method thereafter ends (2610), in the example embodiment.

The method may further comprise preprocessing the at least one physical memory by initializing the at least one physical memory with an object-oriented library that causes the at least one preprocessed physical memory to interpret object-oriented messages as native memory read and write requests, such that the preprocessed at least one physical memory handles the object-oriented messages as native block memory instructions.

Figure 27:
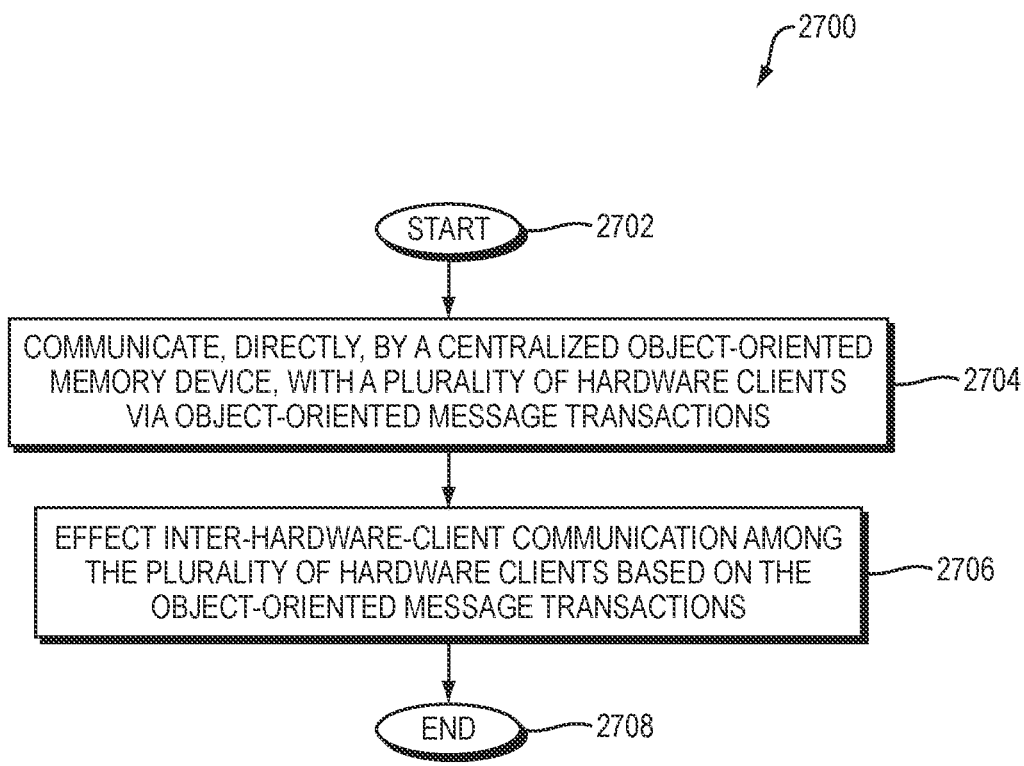

FIG. 27 is a flow diagram 2700 of an example embodiment of a method. The method begins (2702) and communicates, directly, by a centralized object-oriented memory device, with a plurality of hardware clients via object-oriented message transactions (2704). The method effects inter-hardware-client communication among the plurality of hardware clients based on the object-oriented message transactions (2706). The method thereafter ends (2708), in the example embodiment.

Figure 28:
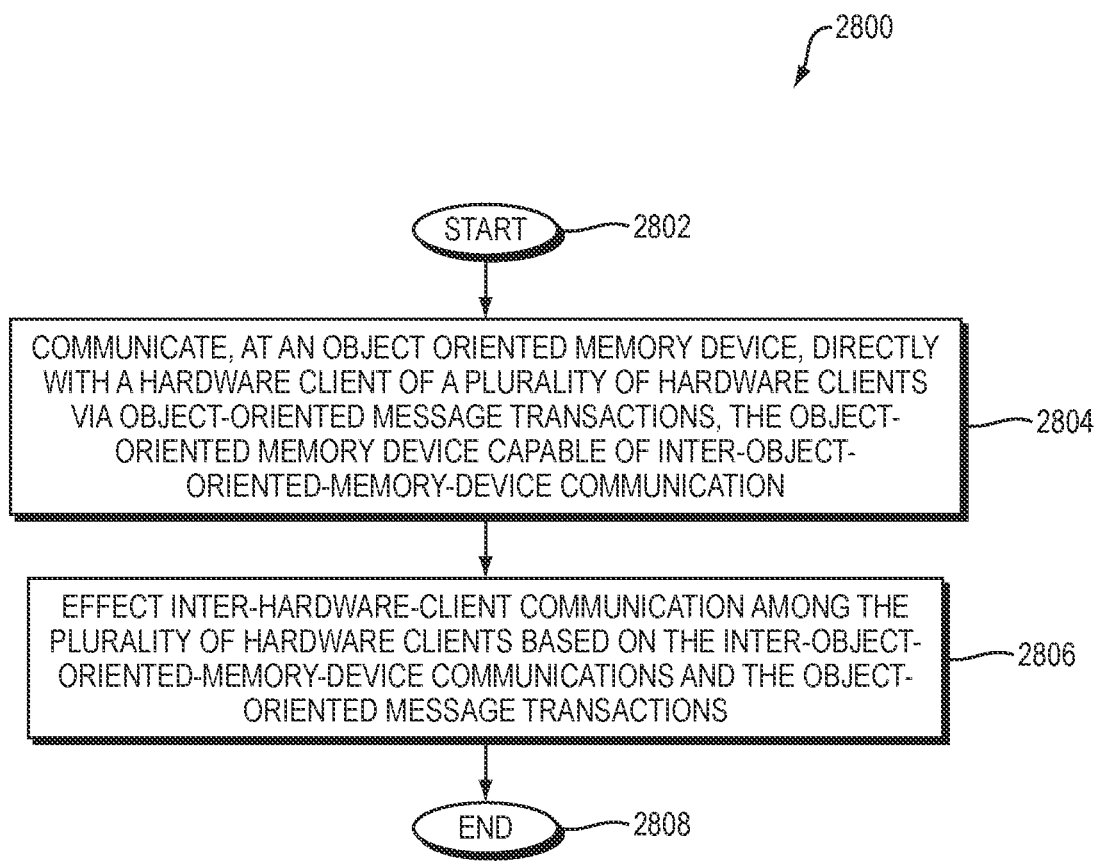

FIG. 28 is a flow diagram 2800 of an example embodiment of a method. The method begins (2802) and communicates, at an object-oriented memory device, directly with a hardware client of a plurality of hardware clients via object-oriented message transactions, the object-oriented memory device capable of inter-object-oriented-memory-device communication (2804). The method effects inter-hardware-client communication among the plurality of hardware clients based on the inter-object-oriented-memory-device communications and the object-oriented message transactions (2806). The method thereafter ends (2808), in the example embodiment. Alternative method embodiments parallel those described above in connection with the example system embodiments of FIG. 19, disclosed above.

Figure 29:
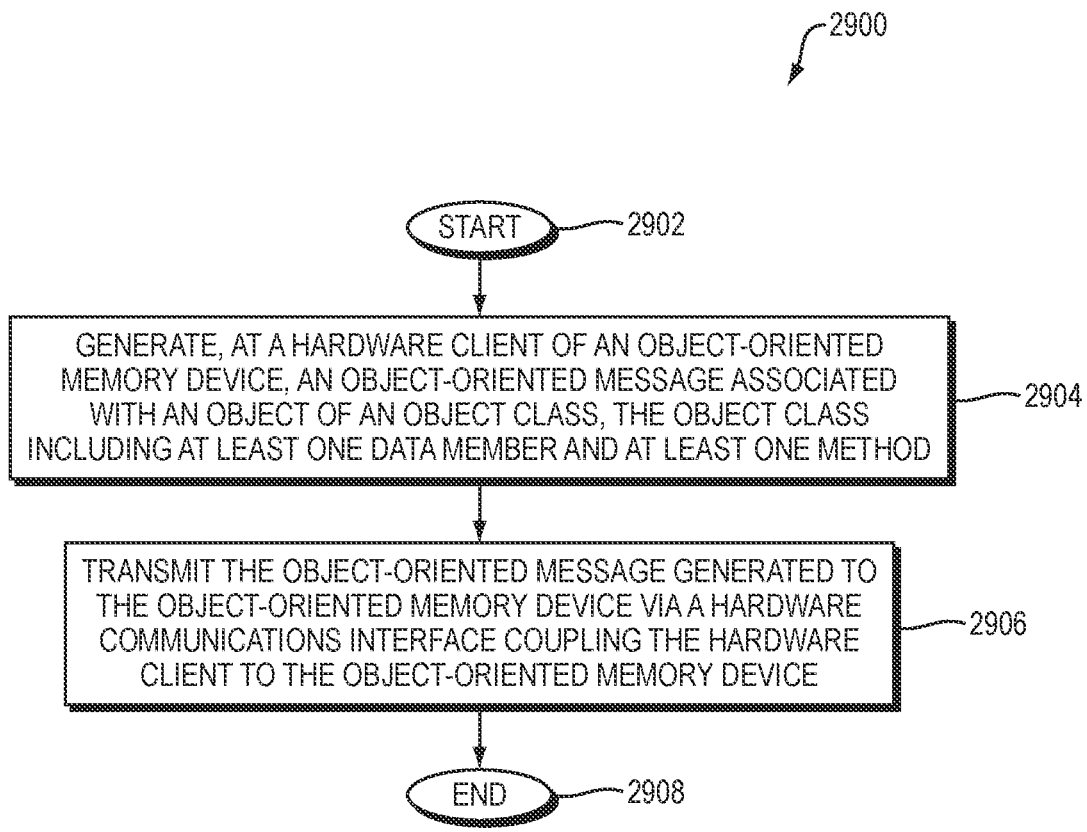

FIG. 29 is a flow diagram 2900 of an example embodiment of a method. The method begins (2902) and generates, at a hardware client of an object-oriented memory device, an object-oriented message associated with an object of an object class, the object class including at least one data member and at least one method (2904). The method transmits the object-oriented message generated to the object-oriented memory device via a hardware communications interface coupling the hardware client to the object-oriented memory device, the object instantiated or to-be instantiated in at least one physical memory of the object-oriented memory device according to the object class, the at least one method enabling the object-oriented memory device to access the at least one data member for the hardware client (2906). The method thereafter ends (2908), in the example embodiment. Alternative method embodiments parallel those described above in connection with the example system embodiments of FIG. 20, disclosed above. Alternative method embodiments parallel those described above in connection with the example hardware client embodiment of FIG. 21, disclosed above.

Figure 30:
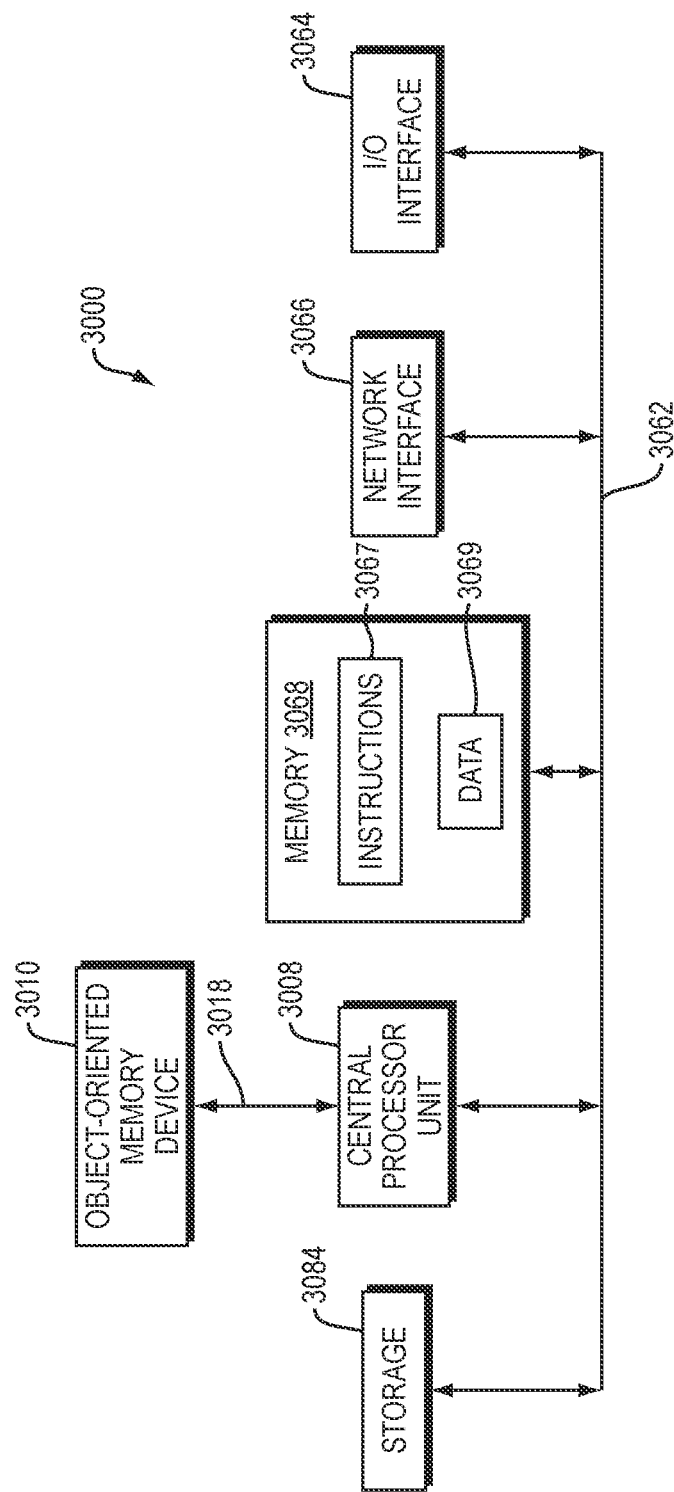
FIG. 30 is a block diagram of an example internal structure of a computer optionally within an embodiment disclosed herein.

FIG. 30 is a block diagram of an example of the internal structure of a computer 3000 in which various embodiments of the present disclosure may be implemented. The computer 3000 contains a system bus 3062, where a bus is a set of hardware lines used for data transfer among the components of a computer or processing system. The system bus 3062 is essentially a shared conduit that connects different elements of a computer system (e.g., processor, disk storage, memory, input/output ports, network ports, etc.) that enables the transfer of information between the elements. Coupled to the system bus 3062 is an I/O device interface 3064 for connecting various input and output devices (e.g., keyboard, mouse, displays, printers, speakers, etc.) to the computer 3000. A network interface 3066 allows the computer 3000 to connect to various other devices attached to a network. Memory 3068 provides volatile or non-volatile storage for computer software instructions 3067 and data 3069 that may be used to implement embodiments of the present disclosure, where the volatile and non-volatile memories are examples of non-transitory media. Disk storage 3084 provides non-volatile storage for computer software instructions 3067 and data 3069 that may be used to implement embodiments of the present disclosure. A central processor unit 3008 is also coupled to the system bus 3062 and provides for the execution of computer instructions.

The central processor unit 3008 is coupled to an object-oriented memory device 3010 and is a hardware client thereof. The central processor unit 3008 and object-oriented memory device 3010 are coupled by a message bus 3018 over which object-oriented messages (not shown) disclosed herein are communicated. The object-oriented memory device 3010 may be the object-oriented memory device 110 of FIG. 1B, disclosed above, or may be any object-oriented memory device disclosed herein and may include any example embodiment of an object-oriented memory device disclosed herein. The central processor unit 3008 may include any example embodiment of a hardware client disclosed above.

The instructions 3067 of the memory 3068 may be based on object-oriented programming (OOP) and because the object-oriented memory device 3010 is naturally aligned with same, performance of the central processor unit 3008 may be improved relative to employ a linear/block memory device in place of the object-oriented memory device 3010, as is disclosed above.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 27, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read-only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A hardware client configured to:
generate an object-oriented message associated with an object of an object class, the object class including at least one method; and
transmit the object-oriented message generated to an object-oriented memory device via a message bus coupled to a communications port of the object-oriented memory device, the at least one method enabling the object-oriented memory device to access data for the hardware client, the communications port allocated solely to the hardware client or shared by the hardware client and at least one other hardware client for communicating object-oriented messages with the object-oriented memory device.

2. The hardware client of claim 1, wherein message bus is coupled to a hardware communications interface and wherein the hardware communications interface includes two uni-directional streaming message bus (SMBus) buses.

3. The hardware client of claim 1, wherein the object class is a buffer object class, queue object class, stack object class, or broadcast object class.

4. The hardware client of claim 1, wherein the at least one method includes an allocation method, de-allocation method, size method, write method, read method, push method, pop method, modify-in-place method, copy method, cyclic redundancy check (CRC) generation method, CRC check method, error-correcting code (ECC) method, randomization method, or a combination thereof.

5. The hardware client of claim 1, wherein the object is a new object to-be-instantiated in at least one physical memory of the object-oriented memory device and wherein the object-oriented message is a request to declare the new object, the request including the object class for the new object, the object class defining the new object.

6. The hardware client of claim 1, wherein the object-oriented message is a request to call method of the at least one method and wherein the request includes a handle for the object and a method identifier of the method of the at least one method.

7. The hardware client of claim 1, wherein the object-oriented message includes at least one argument and wherein the object-oriented memory device executes a method of the at least one method employing the at least one argument included.

8. The hardware client of claim 1, wherein the hardware client is a central processing unit (CPU), Peripheral Component Interconnect Express (PCIe) device, Ethernet device, accelerator device, or digital signal processing (DSP) device.

9. The hardware client of claim 1, wherein the hardware client is a hardware process configured to interact with a stack of an operating system and wherein the object-oriented message is sourced from the stack.

10. The hardware client of claim 1, wherein the hardware client is a hardware process configured to employ data stored in at least one physical memory of the object-oriented memory device and wherein the object-oriented memory device is configured to manage a structure of the data in the at least one physical memory for the hardware process via the object.

11. The hardware client of claim 1, wherein the hardware client is a hardware process, wherein the object is a private storage buffer employed by the hardware process, and wherein the data is stored in the private storage buffer.

12. The hardware client of claim 1, wherein the object is an error-correcting code (ECC) object, wherein a payload is included in the object-oriented message, and wherein the data includes an ECC corrected version of the payload.

13. The hardware client of claim 1, wherein the object is a first-in first-out (FIFO) object and wherein the data is a data element of the FIFO object.

14. The hardware client of claim 1, wherein the object is a stack object and wherein the data includes nested thread context.

15. The hardware client of claim 1, wherein the object-oriented message includes a message type, process identifier, process tag, object identifier, method identifier, argument list, or a combination thereof.

16. A method comprising:
generating, at a hardware client of an object-oriented memory device, an object-oriented message associated with an object of an object class, the object class including at least one method; and
transmitting the object-oriented message generated to the object-oriented memory device via a message bus coupled to a communications port of the object-oriented memory device, the at least one method enabling the object-oriented memory device to access data for the hardware client, the communications port allocated solely to the hardware client or shared by the hardware client and at least one other hardware client for communicating object-oriented messages with the object-oriented memory device.

17. The method of claim 16, wherein the message bus is coupled to a hardware communications interface of the hardware client, wherein the hardware communications interface includes two uni-directional streaming message bus (SMBus) buses, and wherein the transmitting includes transmitting the object-oriented message over an SMBus of the two uni-directional SMBus buses.

18. The method of claim 16, wherein the object class is a buffer object class, queue object class, stack object class, or broadcast object class.

19. The method of claim 16, wherein the at least one method includes an allocation method, de-allocation method, size method, write method, read method, push method, pop method, modify-in-place method, copy method, cyclic redundancy check (CRC) generation method, CRC check method, error-correcting code (ECC) method, randomization method, or a combination thereof.

20. The method of claim 16, wherein the object is a new object to-be-instantiated in at least one physical memory of the object-oriented memory device and wherein the object-oriented message is a request to declare the new object, the request including the object class for the new object, the object class defining the new object.

21. The method of claim 16, wherein the object-oriented message is a request to call a method of the at least one method and wherein the request includes a handle for the object and a method identifier of the method of the at least one method.

22. The method of claim 16, wherein the object-oriented message includes at least one argument and wherein the method further comprises executing, at the object-oriented memory device, a method of the at least one method, the executing employing the at least one argument included.

23. The method of claim 16, wherein the hardware client is a central processing unit (CPU), Peripheral Component Interconnect Express (PCIe) device, Ethernet device, accelerator device, or digital signal processing (DSP) device.

24. The method of claim 16, wherein the hardware client is a hardware process and wherein the method further comprises interacting, by the hardware process, with a stack of an operating system and sourcing the object-oriented message from the stack.

25. The method of claim 16, wherein the hardware client is a hardware process and wherein the method further comprises managing, at the object-oriented memory device, a structure of data in at least one physical memory of the object-oriented memory device for the hardware process via the object.

26. The method of claim 16, wherein the hardware client is a hardware process, wherein the object is a private storage buffer employed by the hardware process, and wherein the method further comprises storing the data in the private storage buffer for the hardware process.

27. The method of claim 16, wherein the object is an error-correcting code (ECC) object, wherein a payload is included in the object-oriented message, and wherein the data includes an ECC corrected version of the payload.

28. The method of claim 16, wherein the object is a first-in first-out (FIFO) object and wherein the data is a data element of the FIFO object.

29. The method of claim 16, wherein the object is a stack object and wherein the data includes nested thread context.

30. The method of claim 16, wherein the object-oriented message includes a message type, process identifier, process tag, object identifier, method identifier, argument list, or a combination thereof.

* * * * *